United States Patent
Cha et al.

(10) Patent No.: US 6,667,004 B2
(45) Date of Patent: Dec. 23, 2003

(54) METHOD OF FORMING A BOX OR BOX ELEMENT OF PLASTIC MATERIAL

(75) Inventors: Philippe Cha, Iffendic (FR); Eric Savatte, Vitre (FR); Dominique Taburet, Bais (FR)

(73) Assignee: La Francaise des Plastiques, Louvigne-de-Bais (FR)

( * ) Notice: Subject to any disclaimer, the term of this patent is extended or adjusted under 35 U.S.C. 154(b) by 116 days.

(21) Appl. No.: 09/836,486

(22) Filed: Apr. 17, 2001

(65) Prior Publication Data

US 2002/0020641 A1 Feb. 21, 2002

Related U.S. Application Data

(60) Continuation-in-part of application No. 09/419,218, filed on Oct. 15, 1999, now abandoned, which is a division of application No. 08/894,076, filed as application No. PCT/FR96/00091 on Jan. 19, 1996, now Pat. No. 6,029,848.

(30) Foreign Application Priority Data

Jan. 26, 1995 (FR) .............................. 95 01141

(51) Int. Cl.[7] .......................... B29C 45/14; B29C 33/14
(52) U.S. Cl. .................... 264/484; 264/259; 264/275
(58) Field of Search ................ 264/250, 251, 264/259, 254, 266, 267, 268, 275, 484; 206/308.1, 309, 310, 312, 387.1, 493; 220/837, 665, 62.22

(56) References Cited

U.S. PATENT DOCUMENTS

| | | | |
|---|---|---|---|
| 2,144,318 A | 1/1939 | Kryder | 220/310 |
| 3,385,422 A | 5/1968 | Lowry | 220/837 |
| 3,511,902 A * | 5/1970 | Santangelo | 264/163 |
| 3,755,031 A * | 8/1973 | Hoffman et al. | 156/79 |
| 3,949,872 A | 4/1976 | Paudras | 206/310 |
| 4,065,539 A * | 12/1977 | Nadel | 264/251 |
| 4,395,817 A * | 8/1983 | Asada et al. | 29/622 |
| 4,732,293 A * | 3/1988 | Landis | 220/276 |
| 4,823,995 A * | 4/1989 | Lewis | 222/545 |
| 5,284,243 A | 2/1994 | Gelardi et al. | 206/310 |
| 5,289,785 A | 3/1994 | MacPherson | 109/42 |
| 5,336,460 A * | 8/1994 | Hettinga | 264/251 |
| 5,522,501 A | 6/1996 | Luckow | 206/308.1 |
| 5,542,531 A | 8/1996 | Yeung | 206/308.1 |
| 5,709,318 A * | 1/1998 | Oder | 222/153.06 |
| 5,762,852 A * | 6/1998 | Hettinga | 264/251 |
| 5,803,251 A | 9/1998 | Gartz | 206/310 |
| 5,845,771 A | 12/1998 | Fu | 206/308.1 |
| 6,029,848 A * | 2/2000 | Cha et al. | 220/837 |

FOREIGN PATENT DOCUMENTS

| | | |
|---|---|---|
| DE | 9404298.5 | 7/1994 |
| EP | 272042 | 6/1988 |
| EP | 576256 | 12/1993 |
| EP | 0492421 B1 | 2/1998 |
| FR | A2004274 | 11/1969 |
| GB | 2154550 | 11/1985 |
| GB | 2185710 | 7/1987 |

* cited by examiner

Primary Examiner—Angela Ortiz
(74) Attorney, Agent, or Firm—Perman & Green, LLP

(57) ABSTRACT

There is described a box or an insert for a box made up of elements, such as cover element (1) and a bottom element (2) both of which are made of molded plastics material and which are hinged to each other means of a hinge (3). According to the features of the invention, there is included a flexible sheet (4) of synthetic material which is fixed to each of the elements (1) and (2) by overmolding so that there is formed an intermediate free zone (40) which, on its own, is the hinge (3). The box can receive various articles, for example compact discs or an insert which can hold and support the disc in the box.

9 Claims, 25 Drawing Sheets

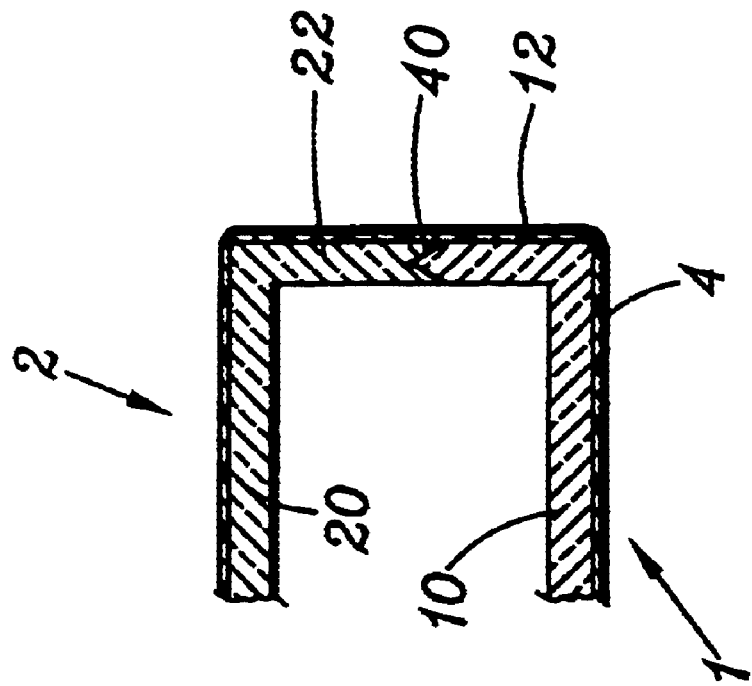
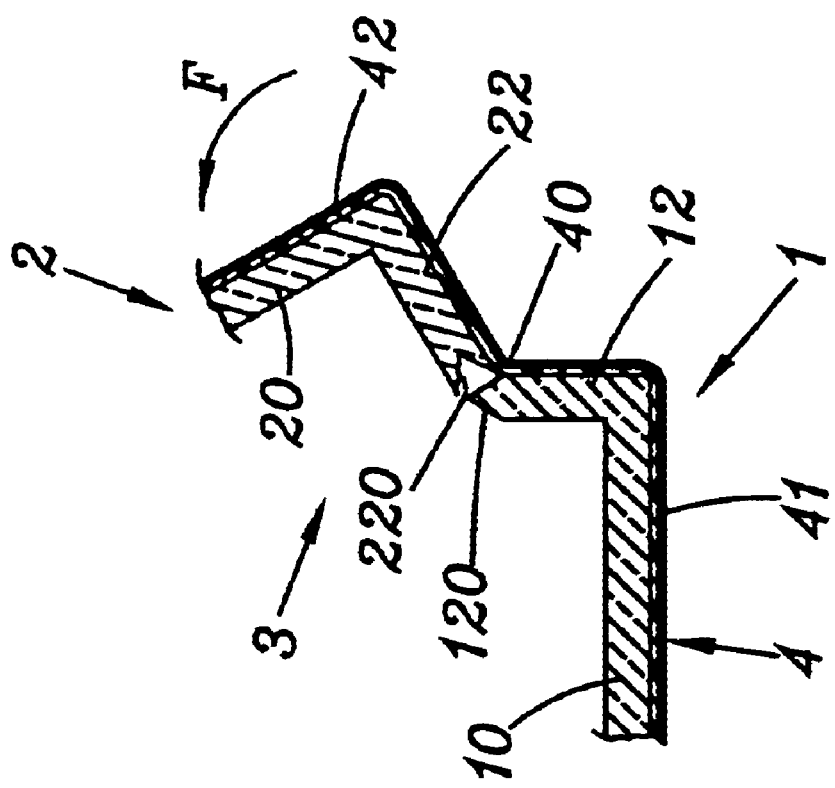

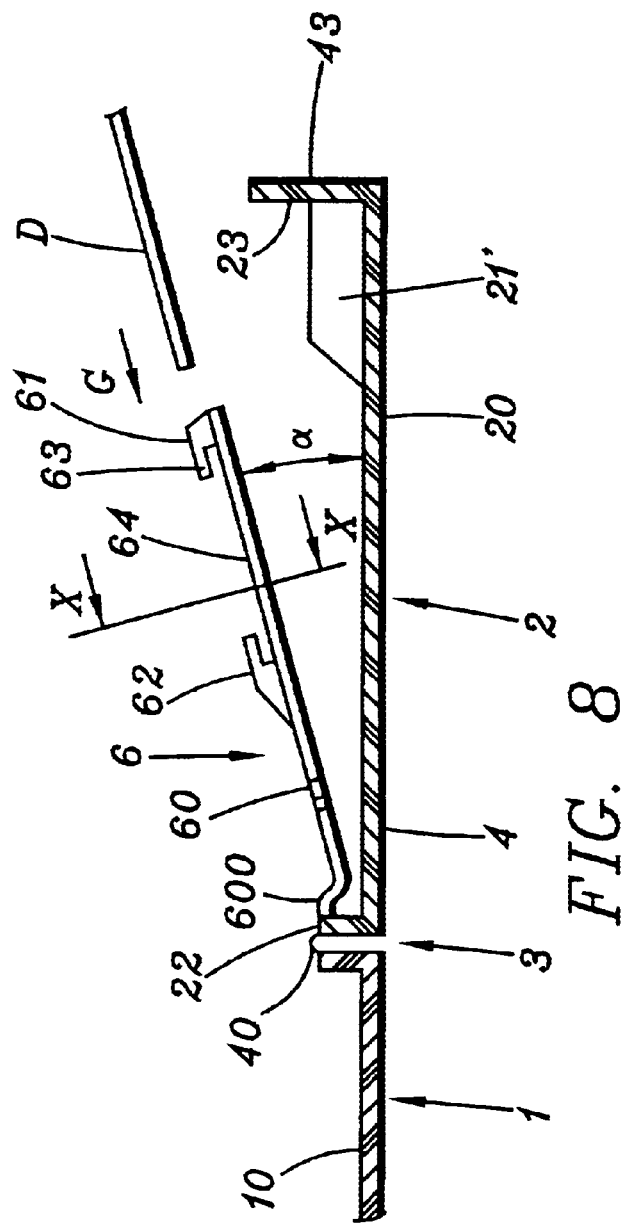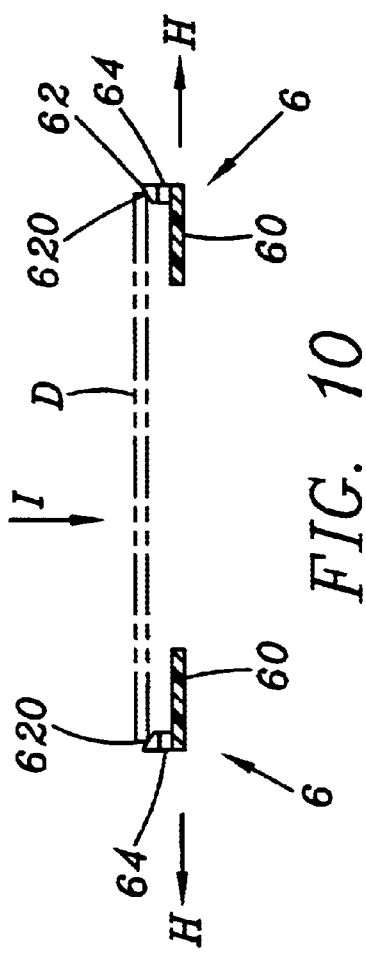

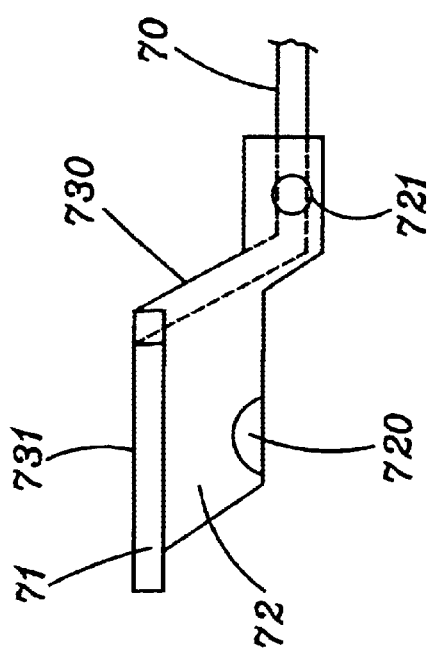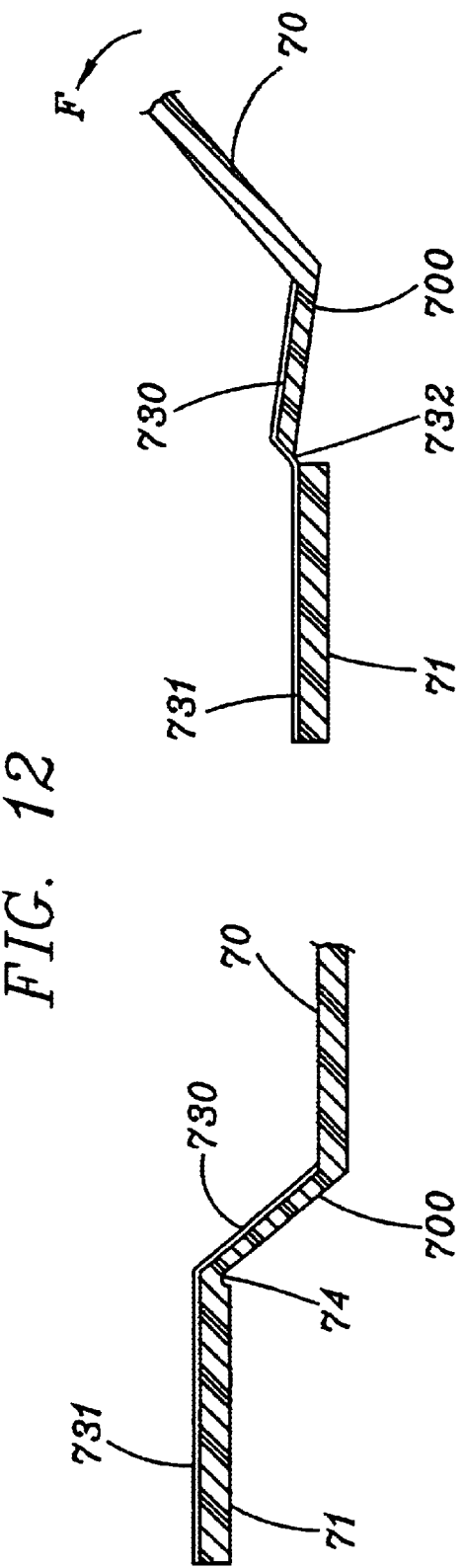

METHOD OF FORMING A BOX OR BOX ELEMENT OF PLASTIC MATERIAL

RELATED APPLICATIONS

This application is a Continuation-in-part of application Ser. No.: 09/419,218, filed Oct. 15, 1999, now abandoned, which is a divisional application from application Ser. No. 08/894,076 filed Jul. 25, 1997 as the National Phase from International Application PCT/FR96/00091, PCT filed Jan. 19, 1996, now U.S. Pat. No. 6,029,848 issued Feb. 29, 2000.

BACKGROUND OF THE INVENTION

1. Field of the Invention

The present invention relates to a box and to an insert for a box, each made up of at least two elements. The elements are made of molded plastic material and hinged to each other via at least one hinge mechanism. In the case of a box, the two elements can be identified as the bottom of the box and the cover of the box.

The features of the present invention is specifically designed for a flat box that is to receive a magnetic or optical medium for high density recording, and more specifically, for a compact disc (i.e., a digital audio disc). The invention is useful with other types of boxes, capable of containing various types of articles.

2. Description of Prior Art

Conventional boxes for storing items such as compact discs essentially comprise two elements, namely a bottom and a cover, which are hinged to each other about a hinge mechanism. Both elements are made of rigid transparent plastic material that is generally injected-molded such as, for example, clear polystyrene.

One of the elements carries two lateral studs which engage in openings provided in the other element, thus forming a pair of stub axles in axial alignment to make up the hinge. A paper label is generally inserted inside each box element and can be seen from the outside because each of the elements is transparent. The label has information concerning the contents of the box. Generally, the cover element label is slid over the inside face of the cover wall and is held therein by lateral tab members. The label is sometimes replaced by, or associated with, a removable booklet. The disc is held in place in a molded tray of plastic material that is clipped in the bottom element, with the label being sandwiched between the tray and the bottom wall. The intermediate tray includes a central disc-retaining member made up of radially-deformable resilient fingers which engage the disc in the central opening of the disc. This retaining member is commonly referred to as a "rosette" or a "thimble". Generally, the bottom label has two marginal flaps folded over at right angles that are placed against the inside faces of the sides of the bottom element. Information is provided on these folded-over flaps to be visible through the sides of the box when the box is stored in such a manner so as to allow the edge to be visible. Some of the disadvantages of the above-described box are that it is difficult and time consuming to manufacture and is relatively expensive. The three elements making it up, i.e., the bottom, cover, and intermediate tray, are manufactured separately by an injection-molding process, and they are subsequently assembled together. In addition to the assembly operation, there is the operation of putting the labels into place. Another drawback of know boxes is the fragility of the lugs carrying the lateral studs constituting the hinge, and giving rise to many rejects on the assembly line and breakages during use.

Great Britain Patent No. 2,185,710 describes a box made by injection molding talc-filled polypropylene. The box is provided with a label formed by a sheet, also made of polypropylene, which is integrated in the box by overmolding during the injection process. The bottom and the cover of that box are formed as a single piece. Furthermore, the bottom and cover are connected together by a hinge-forming zone that is weak. The polypropylene sheet covers the hinge zone in order to provide it with mechanical reinforcement and thus increase its strength characteristics. In this device, the label does not constitute the hinge, and it does not replace the hinge; it merely serves to reinforce it. A major disadvantage of this type of device is that the material forming the box needs to be a non-breaking flexible material since it needs to act as a hinge and must therefore withstand repeated flexing without breaking or cracking.

SUMMARY OF THE INVENTION

A primary object of the present invention is to eliminate the various disadvantages outlined above with regard to the prior art structures by presenting a box structure which, while still being competitive in price, and relatively simple to manufacture, has a hinge that is particularly robust, long-lasting and able to withstand repeated flexing without breaking or cracking.

Another object of the present invention is to make it possible to be able to use rigid and brittle materials, in particular clear polystyrene which has remarkable qualities of transparency in the type of box structure as described herein.

Still another object of the present invention is to provide a box, in particular a flat box for storing a compact disc, in which the disc is held in place without requiring the use of an intermediate tray, but is held directly in the bottom element of the box. In this respect, it should be observed that with conventional boxes, the presence of the label in the bottom element makes it impossible to mold the rosette directly into the bottom wall.

Still an additional object of the present invention is to provide a novel system for holding and supporting a disc in a box; inside the bottom element of the box; the box itself system making it easy to install and remove the disc.

Still an additional object of the present invention is to improve the legibility of information visible on the side of a box used for storing a disc.

The various objects of the present invention described above are achieved by the fact that the box or box element in accordance with the present invention includes a flexible sheet of synthetic material which is fixed to each of the two hinged-together elements that constitute the box by overmolding, the flexible sheet having an intermediate free zone which comprises by itself, the hinge of the box. Thus, since the hinge comprises solely the intermediate free zone, it is sufficient for the material of the sheet to be flexible, and to be capable of mechanically withstanding back-and-forth flexing. The specific nature or composition of the material used for the two box elements is not important. The only critical point is that on overmolding there must be surface adhesion compatibility between the material forming the sheet and materials forming the box elements.

Also, according to various aspects of the present invention:

(i) at least one of the elements possesses a plane main wall, at least one of the faces of which is completely or partially covered by a portion of the flexible sheet;

(ii) the plane main wall has weight-reducing openings that are also covered by the flexible sheet;

(iii) the flexible sheet is an informative label;

(iv) the elements are made of transparent plastic material, such as clear polystyrene;

(v) the flexible sheet is made of a transparent material;

(vi) the label-forming flexible sheet includes information on both faces; and (vii) the flexible sheet is made of material having good mechanical strength while being compatible on molding with the plastic material forming the elements, the material preferably being, a polypropylene-polystyrene or a polyethylene-polystyrene composite.

When the present invention specifically relates to a box:

(i) one of the two elements is a bottom member and the second element is a cover member, and the two elements have complementary mutually engaging profiles disposed facing each other in an intermediate free zone, suitable for providing mutual guidance for the two elements while the box is being closed, and then for providing relative locking therebetween after closure;

(ii) both the box (bottom) element and the cover element each possesses a main plane wall, one of whose faces is completely or partially covered by a portion of the flexible sheet, and at least one of the main walls including a rim adjacent to the hinge and likewise covered by the sheet;

(iii) the rim is provided with a profile for mutual engagement; and (iv) the sheet portion covers the rim and carries on its face informative marking visible through the transparent thickness of the rim, which rim is shaped to from a magnifying glass. The sheet can be fixed to the bottom and cover elements either via their outside faces or via their inside faces.

According to other possible characteristics of the box or of the box element:

(i) it is designed to receive at least one recording medium, such as a compact disc;

(ii) at least one of its hinged-together elements is provided with members for centering and retaining the disc; and (iii) these members for centering and retaining the disc are constituted by a rosette integrally molded with the elements and suitable for engaging in the central hole of the disc.

In one embodiment of the box, the box is flat in shape, rectangular in outline, and has a relatively small thickness. Its bottom element carries the members for centering and retaining the disc held therein.

In an another embodiment, the members for centering and retaining the disk consist of a pair of arms which are suitable for clamping against the outside of the disc and which are integrally molded with the main wall of the bottom element, forming an acute angle therewith, the disc being retained by being clipped between the two arms.

According to other possible characteristics:

(i) the flexible sheet may contain anti-theft detection means;

(ii) one of the hinged-together elements of the box element consists of a tray suitable for supporting and retaining a pair of compact discs, each against a respective one of its two faces, while the other element consists of a support strip, the assembly being dimensioned and shaped in such a manner as to be capable as being inserted inside a box having a shape and dimensions similar to a box designed to receive a single compact disc;

(iii) after being molded, the elements are connected to each other by at least one frangible tab such that they initially form rigid assembly facilitating automatic positioning of discs on the tray, and positioning of the box element in the box; and (iv) the support strip includes lateral webs provided with projections enabling it to be snap-fastened in the box.

In one embodiment of the present invention an insert for a box for storing and supporting an item such as compact discs comprises at least two injection molded plastic rigid elements. The elements are hinged to each other by a single hinge, the hinge including a flexible sheet fixed to each of the rigid elements by overmolding during injection molding. The hinge is formed by an area of the flexible material, the area being free of the rigid plastic material. One of the elements includes a tray member adapted to support and contain a pair of compact discs, each of the discs lying against each other. Included is a second of the elements adapted to be secured to the box and including a support strip member, wherein the elements are formed of rigid and brittle plastic material and the flexible sheet is formed of a flexible material having good mechanical strength sheet and being compatible in a molding environment with the material forming the elements, whereby the insert is dimensioned and shaped to allow the insert to be inserted within a storage box normally designed to store only a single compact disc.

In another embodiment, an insert for a box comprises a tray suitable for supporting and retaining a pair of compact disks, each against a respective one of the discs two faces, and a support strip, to which said tray is hinged. The insert is dimensioned and shaped to be capable of being inserted inside the box which has a shape and dimensions similar to a standard box designed to receive a singe compact disc. Both the tray and the support strip are constructed of a rigid and brittle material molded by injection molding, and both are hinged to each by an intermediate free zone of a flexible sheet made of a material having good mechanical strength while being compatible during molding with the plastic material forming both the tray and the support strip. The sheet is fixed to the tray and the strip by overmolding in the injection mold, and the support strip further includes lateral webs provided with projections enabling the web to be snap-fastened in the standard box.

In yet another embodiment an insert for a box comprises a tray suitable for supporting and retaining a pair of compact discs, each against a respective one of the discs two faces. Included is a support strip hinged to the tray. The combined tray and support strip is dimensioned and shaped to be adapted to being inserted inside the box having the shape and dimensions similar to a standard box designed to receive a single compact disc. The tray and the support strip are both made of a rigid and brittle injection molded material, and are hinged to each other solely by an intermediate free zone of a flexible sheet made of a material having good mechanical strength while being compatible, during injection molding, with the plastics material forming both the tray and the support strip. The sheet is fixed to the tray and the strip by overmolding during injection molding. At each of two ends of the strip there is positioned a transverse web. Included on the outside of the web is a pair of projections, the first of the projections is adapted to snap into a first corresponding hole for receiving a first stub axle for hinging a cover onto a bottom element of the box, and the second of the projection is adapted to snap into a second corresponding hole provided in a side wall of the bottom element of the box.

Yet another embodiment of the present invention comprises a method for manufacturing an insert, the insert being adapted to retain a pair of compact discs therein, the insert being dimensioned and shaped so that it is capable to be inserted within a standard box initially intended for storing s single disc. The insert is formed of two thermoplastic elements including a first element comprising a strip member adapted to be secured to the box, and a second element comprising a tray member adapted to support a pair of compact discs, one against each of its two faces, the elements being formed of rigid and brittle plastic material and being hinged to each other by a single hinge, the hinge including a flexible thin sheet having mechanical strength and being compatible on molding with the material forming the elements, the flexible thin sheet being fixed to each of the elements by overmolding during injection molding. The hinge is formed by an area of the flexible material which is free of the rigid plastic material, wherein one uses an injection mold comprising two complementary half mold parts. The mold includes a first part and a second part, which may either be brought together in order to close the mold or separated from each other in order to open the mold. The mold defines when closed two adjacent cavities, the first cavity corresponding to the shape of the tray member and the second cavity to the shape of said strip member. The first half mold part is provided with an injection nozzle having a point, the nozzle suitable for introducing hot molten thermoplastic material into the first cavity when the mold is closed. The cavities are separated from each other, when the mold is closed, by a protuberance formed in one of the half mold parts and having substantially a shape with a chamfered linear nose edge which comes very close to a flat area of the other half mold part when the mold is closed, the nose edge being cut by at least a transverse gap situated in the vicinity of the injection nozzle when the mold is closed. The method comprising the following steps: (a) introducing the flexible sheet between the mold parts and positioning the sheet against a flat area, in front of the nose; (b) holding said flexible sheet against the flat area; (c) closing the mold, so that the chamfered linear edge of the nose firmly presses the flexible sheet toward the flat area; (d) injecting molten thermoplastic material into the mold through the injection nozzle so that it simultaneously fills directly the first cavity and via the gap, the second cavity, and covering a side of the flexible sheet without coating the part that is gripped between the chamfered linear edge and the flat area; (e) allowing the injected material to cool and to become stiff; and (f) ejecting the molded insert, the strip member and the tray member while each remain rigidly connected to each other by at least a frangible tab constituted by the material contained in the gap at the end of the molding process, in such manner that the hinging can only occur later, after breaking of the tab when the user pivots the tray member for the first time.

BRIEF DESCRIPTION OF THE DRAWINGS

Other characteristics and advantages of the present invention appear from the description and the following drawings which show various embodiments as examples wherein:

FIGS. 3 and 3A are detailed sectional views of the hinge zone of the box of FIG. 1, while closing is taking place, (FIG. 3)and at the end of closing (FIG. 3A);

FIG. 8 is a partial sectional diagrammatic front-edge view on plane VIII—VIII of FIG. 9, showing a bottom element for supporting a disc that is provided with a novel disc-retaining system;

FIG. 10 is a sectional end view on plane X—X of FIG. 8 showing the resilient arms constituting the retaining system;

FIG. 12 is an end view of the strip constituting the box element of FIG. 11;

FIGS. 12A and 12B are fragmentary section views showing the hinge zone of the two portions of the box element of FIG. 11, respectively before and after the tray has been pivoted, the section plane being the mid-longitudinal plane of symmetry of the element;

DETAILED DESCRIPTION OF THE PREFERRED EMBODIMENT

Figure 1:
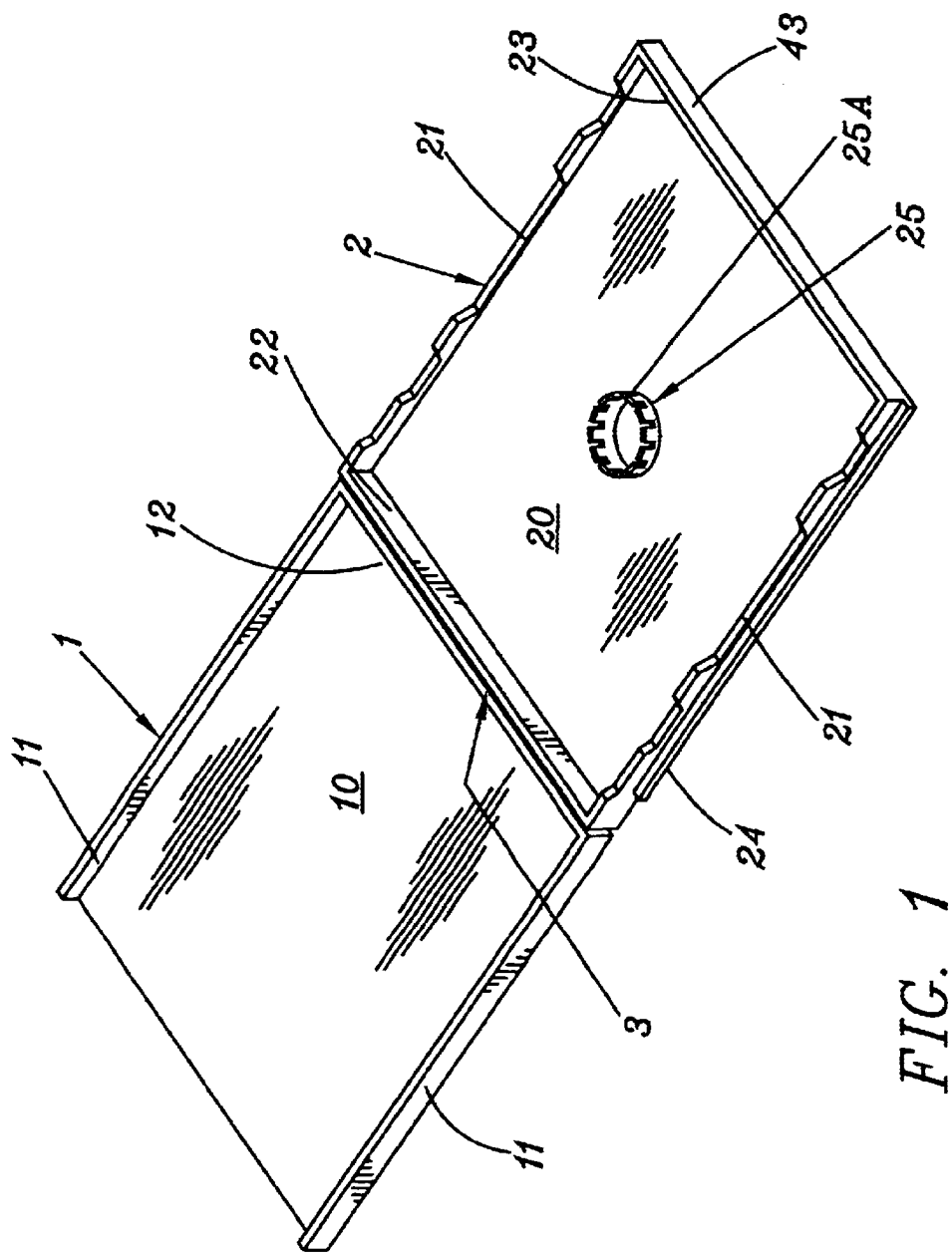
FIG. 1 is a perspective view of a first example of a flat compact box for containing a disc the box being shown in an open position.
Figure 2:
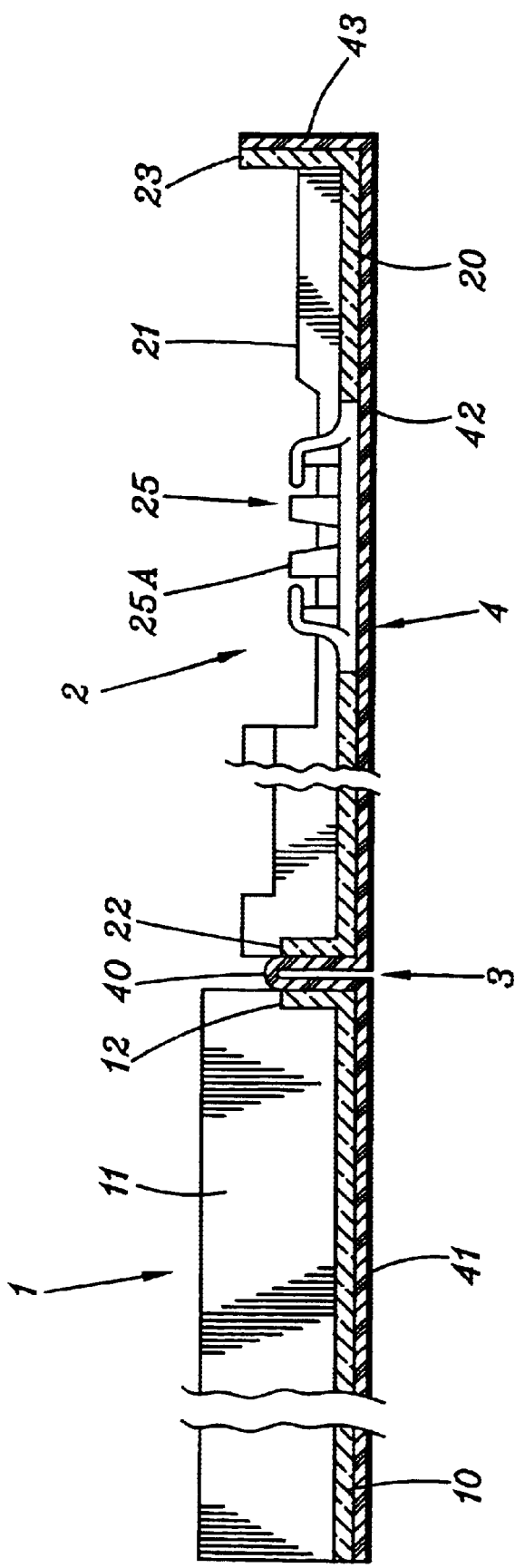
FIG. 2 is a partial cross-sectional view of the box illustrated in FIG. 1, taken along a plane that is perpendicular to the axis of the hinge.

The box illustrated in FIGS. 1 and 2 is an example of one embodiment of a box for containing a packaging compact disc in accordance with the features of the present invention. The box illustrated comprises two injection-molded clear polystyrene elements, namely a bottom element 2 and a cover element 1. Reference 10 designates the rectangularly-shaped main wall of element 1, and reference 20 designates the similarly-shaped main wall of element 2. These two elements are hinged together similar to pages of a book by means of a hinge zone 3.

Cover element 10 includes lateral flanks 11 folded at right angles relative to wall 10 and element 20 includes similar lateral flanks 21 which are notched in their central zones thereby making it possible to firmly support a disc retained in the box. Remote from hinge 3, element 2 includes partition 23 which likewise extends from the box at right angles to wall 20. Flanks 21 are set back relative to the edge of wall 20, thereby leaving a lateral rim 24 on the box. When the box is closed, flanks 21 or elements 2 come into contiguous contact against flanks 11 (inside the flanks)on element 1, while partition 23 constitutes the side of the box remote from hinge 3.

As more fully explained below, a label-forming sheet is fixed to the outside faces of elements 1 and 2, with a portion 43 thereof that is folded over the partition 23 being visible in FIG. 1.

Resilient locking means (not shown) formed of small projections provided in one of the elements (1 or 2) engage in recesses provided in the other element, and function to hold the box in a closed state. Positioned close to the center of wall 20 and extending from bottom element 2 is a rosette 25 that is integrally molded with bottom element 2. The rosette includes resilient fingers 25A suitable for engaging in the central opening of a disc to hold it in place against the wall 20 and prevent it from moving once positioned inside the box.

In the hinge zone 3, (see FIG. 2) walls 10 and 20 are folded-over at right angles so as to form respective adjacent partitions 12 and 22. The height of these partitions is equal to half the thickness of the box when in its closed state, thereby enabling these two partitions to be in a common plane when the box is closed (see FIG. 3A).

According to an essential characteristic of one embodiment of the present invention, the box includes a flexible sheet 4 of synthetic material (See FIG. 2). Flexible sheet 4 is made of a material that has good to excellent mechanical strength characteristics, particularly against tearing and against back-and-forth flexing. In addition, flexible sheet 4 is formed of a material that is compatible with the plastic material used to form box elements 1 and 2 so as to be capable of adhering thereto by overmolding. Examples of a suitable material that can be used for the flexible sheet 4 include polypropylene-polysytrene or polyethylene-polysytrene composites. These composites comprise a sandwich film obtained by adhesion or by coextrusion. The thickness of the flexible sheet 4 may lie in the range of approximately 50 micrometers to 150 micrometers. An example of a preferred thickness of the flexible sheet would be about 80 micrometers. The flexible sheet 4 is a preferably rectangular sheet of a width equal to the width of walls 10 and 20, and of a length slightly greater than the sum of the lengths of walls 10 and 20 plus the heights of sides 12, 22, and 23.

As illustrated in FIG. 2 references 41, 42, and 42 are those portions of the flexible sheet 4 which adhere respectively to faces 10 and 12 of element 1, and 22, 20, and 23 of element 2. The intermediate free zone between the two elements 1 and 2 is referenced 40.

In the embodiment of the present invention illustrated in FIGS. 1 to 3 and 3A, flexible sheet 4 adheres to the outside faces of the box. Elements 1 and 2 are made in a single appropriate mold by an injection molding process with the flexible sheet 4 having previously been put into place in the mold. For improving the quality of the overmolding, it is preferable for the polystyrene face of the flexible sheet to be the face that faces into the inside of the mold so as to come into contact with the molten clear polystyrene, when it is injected into the mold.

Although not required, the following would tend to improve the quality of the overmolding. Before and during molding, flexible sheet 4 can be retained inside the mold by any means known in the injection molding art, such as, for example, implementing an electrostatic effect. After unmolding, sheet 4 with the element portions 41 and 42 adhere completely with elements 1 and 2 respectively, while free intermediate zone 40 acts as a hinge given the flexibility and suppleness of the sheet.

As seen in FIGS. 3 and 3A, free edges 12 and 22 have complementary engaging shapes 120 and 220, one of which is concave and the other of which is convex (e.g. V-shapes or U-shapes), thereby serving to guide them while the box is being closed (the closure being symbolized by arrow F in FIG. 3). Thus, after closure, these shapes thus lock elements 1 and 2 against movement in translation relative to each other.

According to an advantageous characteristic of the present invention, flexible sheet 4 can be printed on and act as an informative label, which function has previously has been provided by paper labels that needed to be inserted within elements 1 and 2. The flexible sheet 4 is printed on prior to the molding operation such that a finished product leaves the mold ready to receive a compact disc. Preferably, portions 41 and 42 cover the outside faces of portions 10 and 20 respectively in full. However, in accordance with the features of the present invention it is entirely possible for them to partially cover the faces. The information, in the form of writing, photographs, drawings, and/or other symbols, can be printed on the outside surface thereto. Writing may also be provided on the sides of the box, overlying the portions 12, 22, and 23. Since elements 1 and 2 are made of a transparent material, it is also possible to provide information marking on the inside face of flexible sheet 4. These markings becoming visible when the box is opened.

Figure 4:
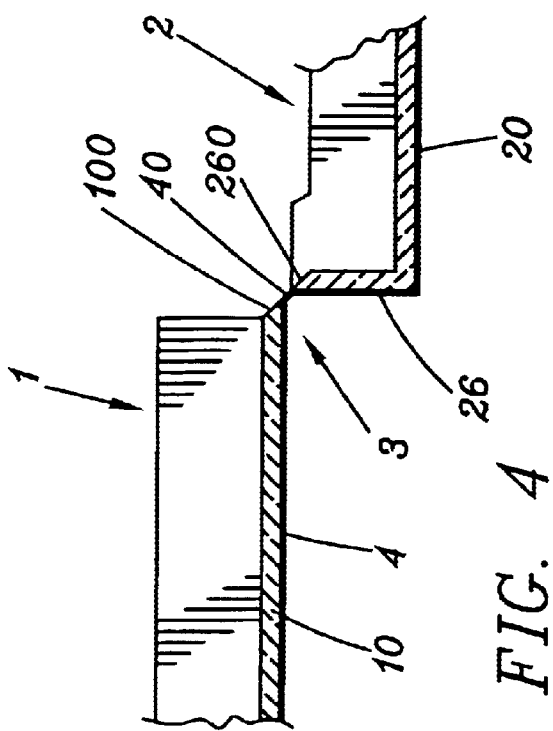
FIG. 4 is a detailed view of the hinge zone of a different embodiment of a box, the box being in an open position.
Figure 4A:
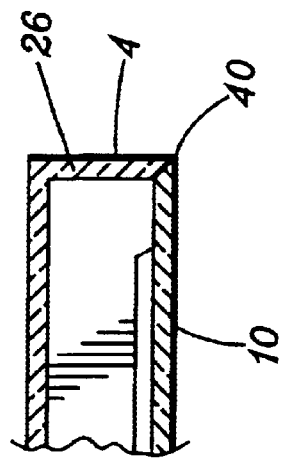
FIG. 4A is a view of the hinge shown in FIG. 4 but illustrating the box in a closed position.

In the particular embodiment of the present invention illustrated in FIGS. 4 and 4A, one of the elements, i.e., element 1, does not have a partition in the vicinity of the hinge. The other element 2 has such a partition, i.e. reference 26. The free zone 40 of the flexible sheet 4 is thus directly at the end of wall 10. It can be seen from FIGS. 4 and 4A how portion 40 acts as a hinge. Free edges 100 and 260 of walls 10 and 26 respectively are advantageously chamfered to provide sufficient clearance to the hinge zone 3, even though the free zone 40 of the sheet is narrow (thereby limiting the amount of clearance).

Figure 5:
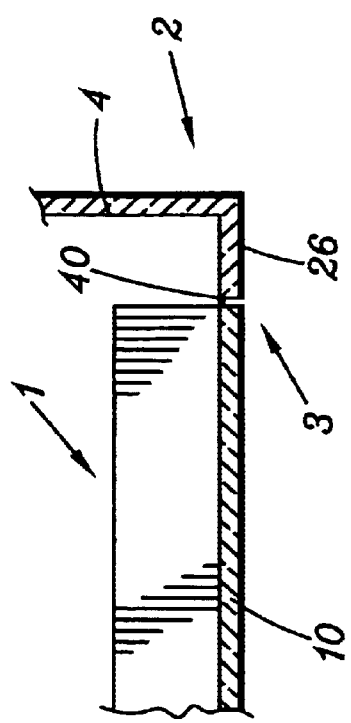
FIGS. 5 and 5A are cross sectional views similar to FIGS. 4 and 4A respectively, illustrating another embodiment of the hinge zone of a box in accordance with the features of the present invention.
Figure 5A:
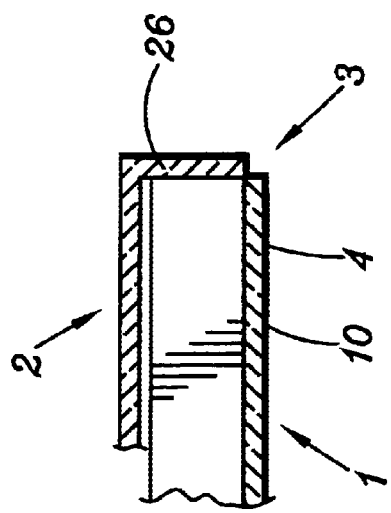

In the embodiment of the present invention illustrated in FIGS. 5 and 5A, flexible sheet 4 is fixed to the inside of the box; the embodiment illustrated being similar to that shown in FIG. 4, element 1 having no partition, while element 2 includes partition 26. Flexible sheet 4 consequently adheres to the inside face of wall 10 and to the inside faces of wall 20 and of partition 26. The information provided on the outside surface of sheet 40 nevertheless remains visible because these walls are transparent. In this embodiment, the extent to which the box can be opened is limited (see FIG. 5).

Figure 6:
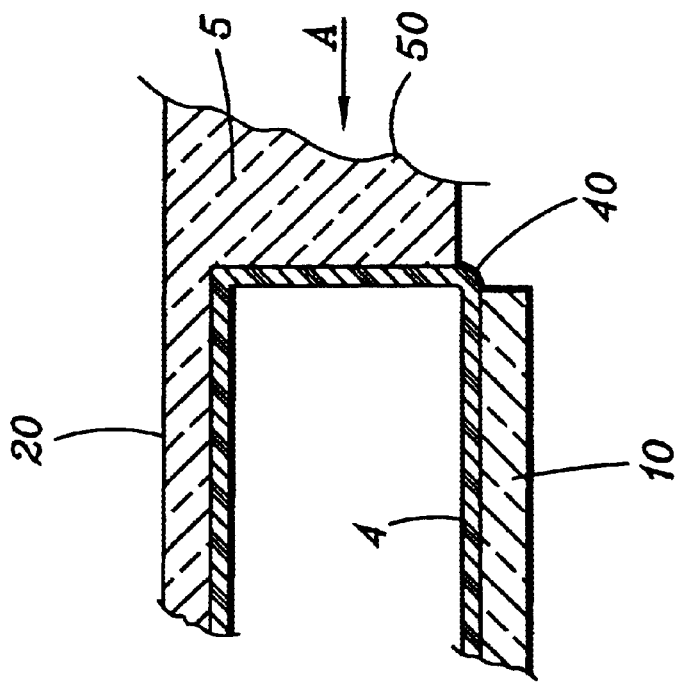
FIG. 6 is a cross sectional view of still another embodiment of a hinge zone of a box in accordance with the features of the present invention in which the side of the box produces the effect of a magnifying glass.

In the embodiment illustrated in FIG. 6, the end partition of portion 20, (given reference 5) has a special configuration. Its outside face 50 bulges so as to be curved in such a way so as to act as a magnifying glass. This particular feature is known in the art such as, for example, see DE-U-9 404 298. Thus, when looking at the side of the box, i.e. at its hinge end, the end symbolized by arrow A, an observer can read marks on flexible sheet 4 that are in register with partition 5 in magnified form, thereby improving legibility.

Figure 7:
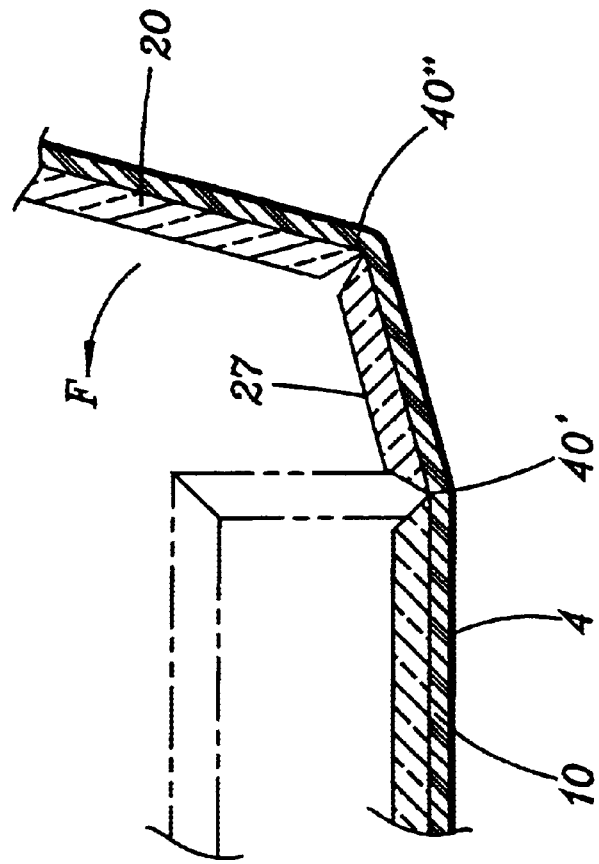
FIG. 7 shows a cross sectional view of still another embodiment of a hinge zone of a box in accordance with the features of the present invention, this box having two hinges.

In the embodiment of the present invention illustrated in FIG. 7 (which shows a box in the process of being closed) the box has two hinges. The side of the box comprises a plate 27 interposed between the walls 10 and 20. Flexible sheet 4 is overmolded over all three of these elements i.e., (10, 20, and 27) thereby resulting in two hinge-forming free zones 40' and 40". Chamfered ends analogous to the ends 100 and 260 of FIG. 4 allow complete closure to be possible, as represented by the dotted lines in FIG. 7.

Figure 9:
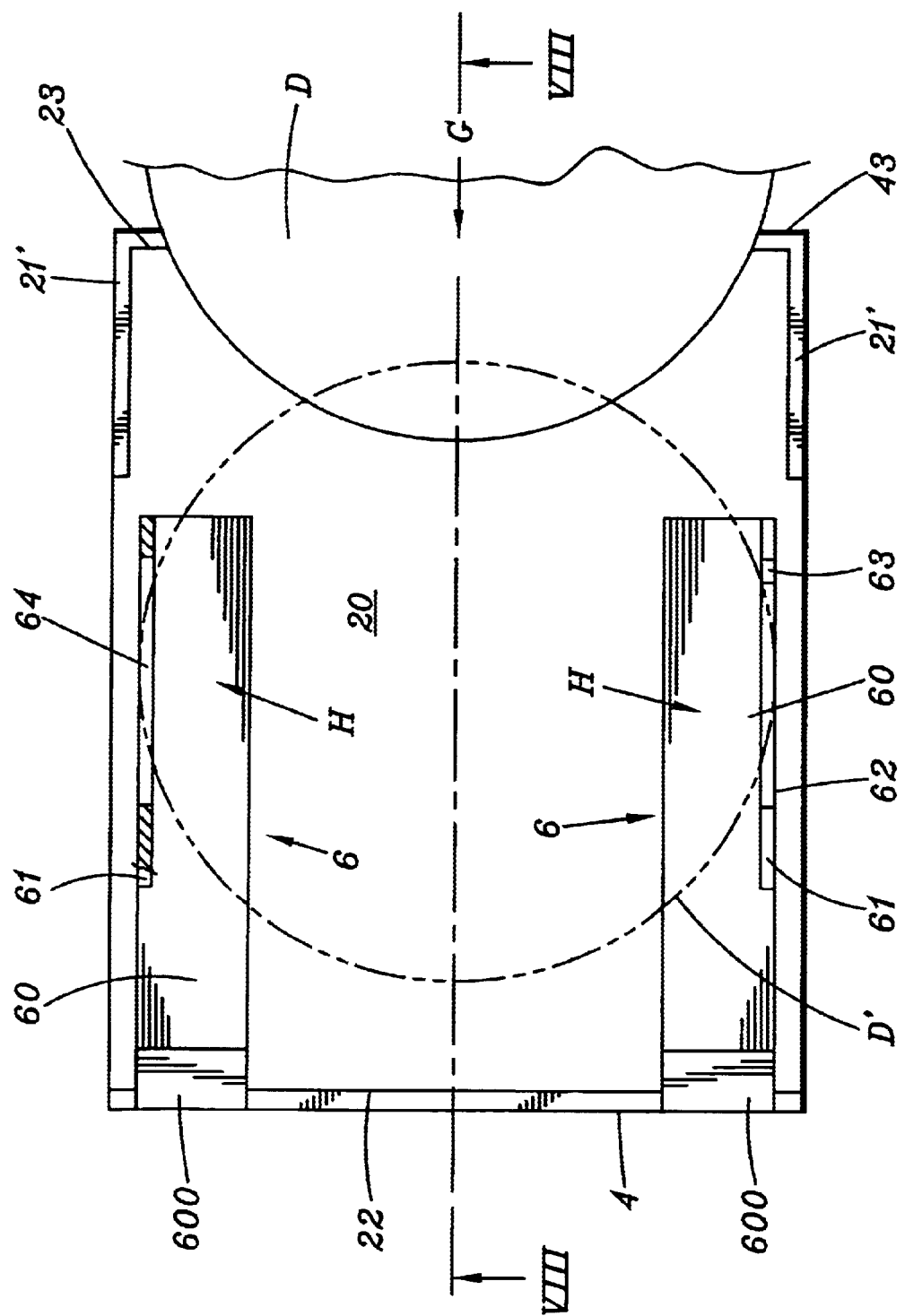
FIG. 9 is a partial sectional plan view of the bottom element shown in FIG. 8.

FIGS. 8 to 10 illustrate a box fitted with a novel system for retaining a compact disc D. This feature comprises a pair of lateral arms 6 in the form of pieces of plastic material shaped like microscope slides and integrally molded with bottom element 2. Bottom element 2 is hinged to the cover element 1 by a hinge zone 3 formed by the free zone 40 of flexible sheet 4. The two slides 60 are coplanar, and their plane is at an acute angle relative to wall 20 of the bottom (see FIG. 8). Angle α can be in the range of about 10° to 30°, approximately. Slides 60 are connected to partition 22 adjacent to the hinge zone 3 by a flexible zone 600. The slides 60 extend parallel to the lateral sides of bottom element 2, and at a small distance therefrom. Lateral flanks 21' from bottom element 2 are of limited length; they do not come into register with arms 6 so as to make unmolding possible. On the outside portion, each slide has a rim 61 folded upwards at right angles and situated in register with the central zone of the box. An upwardly-open longitudinal slot 64 is formed in each rim 61 and on either side thereof project portions 62 and 63. Ignoring the clearance necessary for engagement, slots 64 are of a height that is equal to the thickness of a compact disc D. The two arms 6 are symmetrically disposed about the longitudinal axis of the box. Also, the spacing between the rims 61 is slightly smaller than the diameter of the disc D.

FIGS. 8 and 9 specifically illustrate a disc being put into place in an open box. The disc D is presented as being in an oblique plane substantially equal to the plane of the slides 60, and is inserted between the two arms 6 as illustrated by arrow G. Specifically, it is specifically inserted over the slides 60 which serve to guide it. Since the diameter of the disc is slightly greater than the spacing between rims 61, arms 6 initially flex outwards, as represented by arrows H in FIG. 9. The lateral edges of the disc then engage in slots 64 and arms 6 move back towards each other due to their own resilient nature, thereby holding the disc captive (referenced D') in the position in which the disc is to be retained. When the box is closed, the wall of cover element 1 presses against arms 6 so the end zones 600 bend resiliently towards bottom wall 20. The disc is thereby laid flat immediately above the bottom surface 20. Conversely, when the box is opened, slides 60 automatically move upwards because of their resilient nature, thereby returning to the position shown in FIG. 8. It thereby is then easy to extract the disc by pulling in the direction opposite to arrow G. It is easy for the user to take hold of the disc by inserting a finger in its central opening. This holding system facilitates the operations of both installing and removing a disc.

The top edges of the projecting portions 61 and 62 are preferably chamfered towards the inside so as to form oblique facets. FIG. 10 illustrates the oblique facets 620 of projections 62. Thus, it is also possible to insert the disc D by moving it in a downwards direction perpendicularly to the plane of the slides 60, as symbolized by arrow I. By a wedging effect, arms 6 extend resiliently outwardly (arrows H) until the edge of the disc becomes inserted in the slots 64. This is particularly advantageous when loading discs into the box automatically, for example, the kind of loading process that occurs in the factory.

Naturally, a disc-holding system based on resilient arms 6 could also be used with boxes or with box elements other than those implemented in accordance with the present invention, in which the hinge interconnecting the two hinged-together elements is not constituted by a free zone of an overmolded sheet. It can be applied, for example, to boxes having a conventional hinge made up of lateral stub axles.

In accordance with the features of the present invention, a theft-detection label can be inserted into a box containing a compact disc or other article. The label is provided with, for example, an electronic microcircuit, a magnetic track, a metal powder, or encoded information, or other means (e.g. copper particles) suitable for being detected by special means which are installed, for example, in a gate situated at the exit portion of a business (e.g. a retail store). The issue arises of the risk of a label being removed which would render the label detection system inoperative. In a development in accordance with the features of the present invention, anti-theft detection means are directly contained in the flexible sheet 4 or are fixed thereto. Thus, when the detection means is in the form of a printed circuit, the circuit can be printed directly on the flexible sheet 4 either before or after it is overmolded with the remainder of the box. Such a detection means would be basically impossible to remove.

Figure 11:
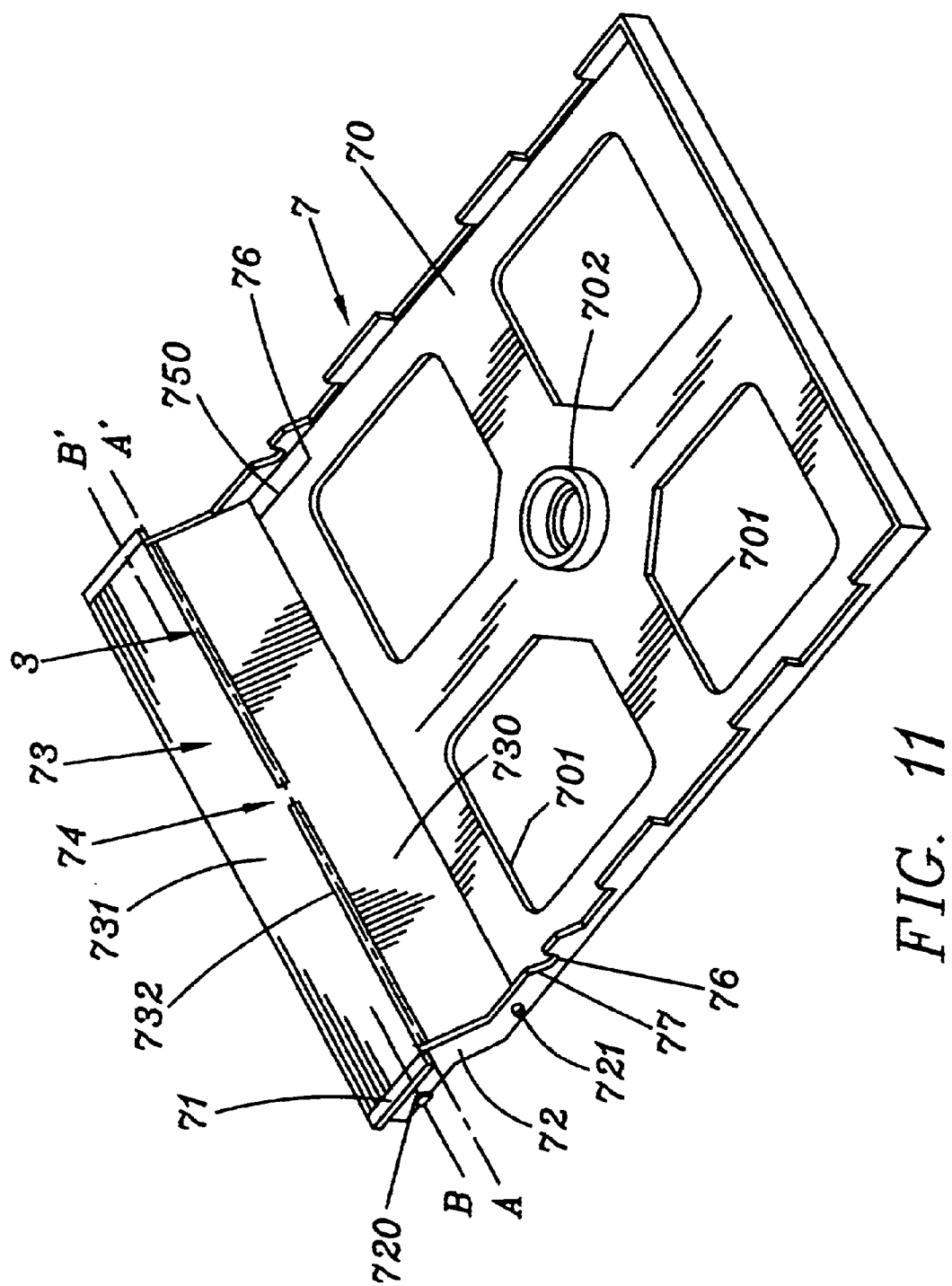
FIG. 11 is a perspective view of a box element in accordance with the features of the present invention having a pivoting tray for receiving a pair of compact disks.

The box element 7 illustrated in FIGS. 11 and 12 is of the same general type as that described in U.S. Pat. No. 5,284, 243. However, in accordance with the features of the present invention the box comprises a device having a support strip 71 formed of plastic material to which a pivoting tray 70 is hinged. The tray 70 has two central rosettes (only one of which can be seen in FIG. 11 i.e. 702) for the purpose of centering and holding respective compact discs (not shown) on each of its two faces. The tray includes perforations 701 which help make the entire structure lighter in weight. At each of its two ends, strip 71 has a transverse web 72 provided on the outside with a pair of projections 720, 721. The assembly 70–71 is shaped and dimensioned in such a manner as to be capable of being inserted into a box similar to a standard box as shown, for example, in FIG. 1 and initially designed to receive only one compact disc. In the sides of the box, the projections 720 snap into holes for receiving (in the opposite direction) the stub axles for hinging the cover onto the bottom element of the box, where the hinge axis is referenced bb' in FIG. 11. Projections 721 snap into other holes provided in the side walls of the bottom element of the box. The tray 70 includes a sloping rim 700 (See FIG. 12A) adjacent to the strip and hinged to one side of the strip via a hinge 3 about an axis aa' parallel to bb'. (See FIG. 11)

In the specific embodiment described in U.S. Pat. No. 5,284,243, hinge 3 is implemented by a line of weakness in the material, so elements 71 and 70 constitute a one-piece molding. In accordance with the feature of the present invention, this hinge is made by means of a flexible sheet 73 which, as in the box embodiments described above, is fixed to each of the elements 71 and 70 by overmolding, so these elements are constituted by separate parts. References 730 and 731 (Note FIGS. 11, 12, 12A and 12B) designate zones of the sheet 73 which adhere to the parts 700 and 71 respectively. They are separated by a narrow gap or intermediate free zone 732 which, alone, constitutes the hinge 3. Naturally, as in the preceding embodiments, the sheet 73 and the elements 70 and 71 must be made of materials that are compatible with a plastic molding. In addition process sheet 73 must be mechanically strong, both in traction and in flexing. The materials used can be the same as those materials referred to above.

In the embodiment illustrated in FIG. 11 reference 74 designates an attachment zone or tab connecting the rim 700 to the strip 71 (See FIG. 12A). This zone is provided in the central zone (in the longitudinal midplane of symmetry of the box element) and it is obtained by having an appropriate channel in the mold, enabling the strip 71 and the part 70 to be molded as a single block. The resulting assembly is not deformable and is therefore easy to handle, particularly while compact discs are being put into place on tray 70 by means of an automatic machine, and subsequently while the device is being inserted into a box.

The attachment tab 74 is frangible, i.e. it has a low mechanical strength, thereby making it easy to break. Thus, on the first occasion that the tray is pivoted (arrow F, of FIG. 12B), the tab 74 breaks, and the part 70 is thereafter hinged to the strip 71 by the free sheet zone 732. Naturally, the sheet 73 can be printed either on both faces (which is advantageous only if at least one of the parts 70 and 71 is made of transparent material), or else on one face only, thereby likewise acting as a label providing information and/or decoration. The part 730 of the sheet can be given sufficient area for it also to cover, partially or completely, the main part 70 of the tray. (See FIG. 11)

According to the embodiment illustrated in FIG. 11, the lateral transverse webs 72, which form integral parts of support strip member 71, are also connected to the lateral sides of the tray member 70 by thin breakable areas 76, constituted by the material remaining at the basis of a notch 77. Each lateral web is separated from the front part of the part 70 by a slot 750.

Figure 11A:
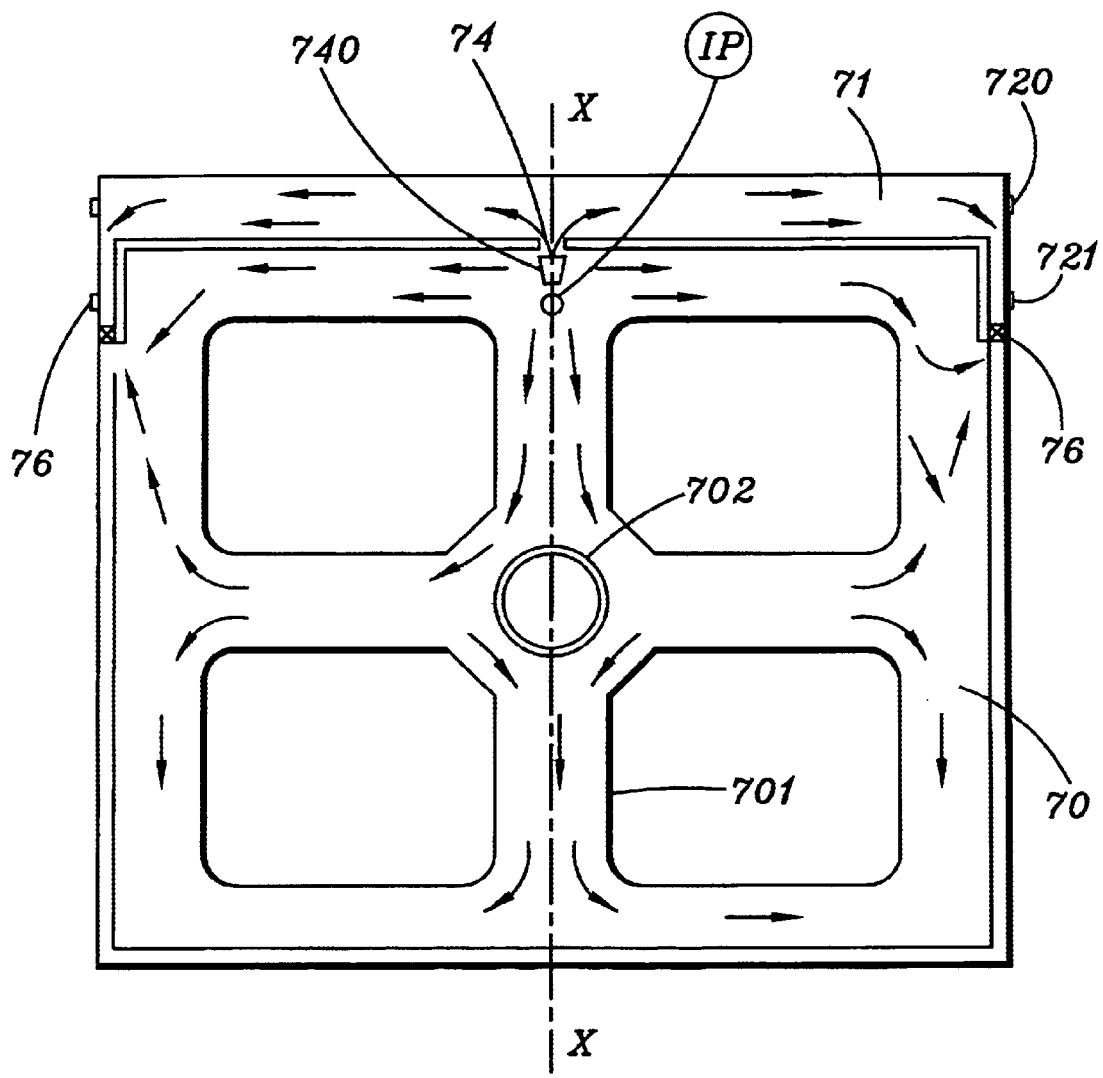
FIG. 11A is a plan view of the box element illustrated in FIG. 11 showing the flow pattern of the plastic material forming the box element during the molding process therefore.

As seen in FIG. 11A, the flow of molten plastic during the plastic molding process (note arrows indicating flow of molten plastic) forming the main part 70 and the strip member 71 meet in these zones, forming the weakened areas 76.

Figure 11D:
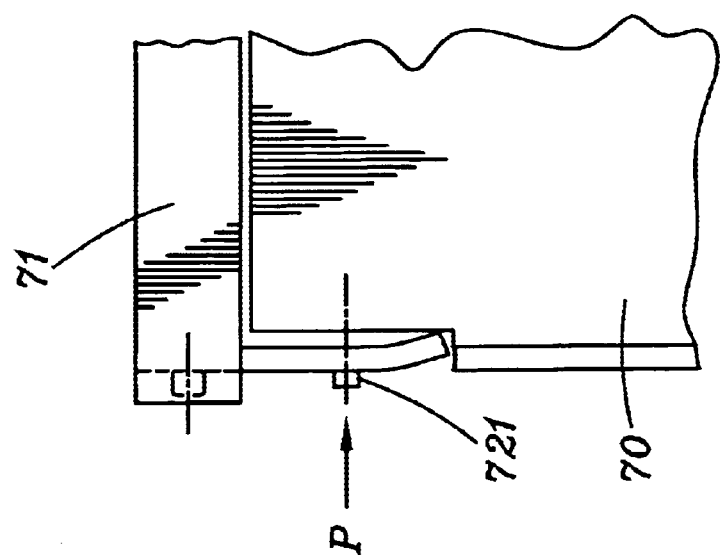
FIG. 11D is a third fragmentary plan view of the box and tray illustrated in FIG. 11.
Figure 11C:
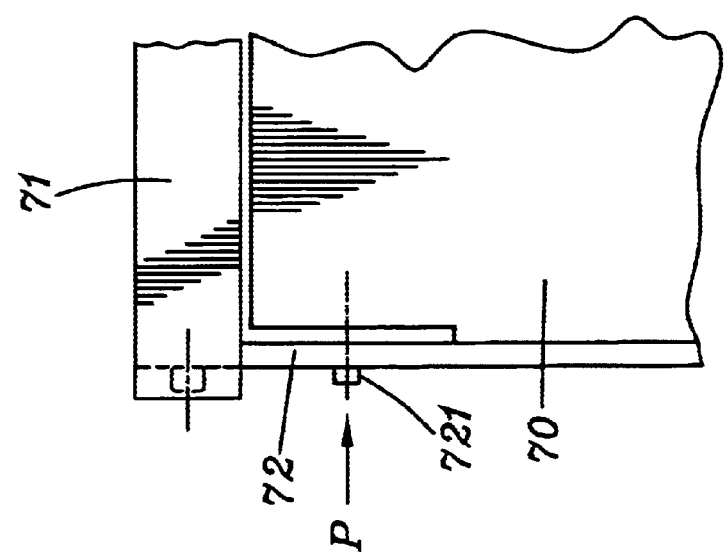
FIG. 11C is a second fragmentary plan view of the box and tray illustrated in FIG. 11.
Figure 11B:
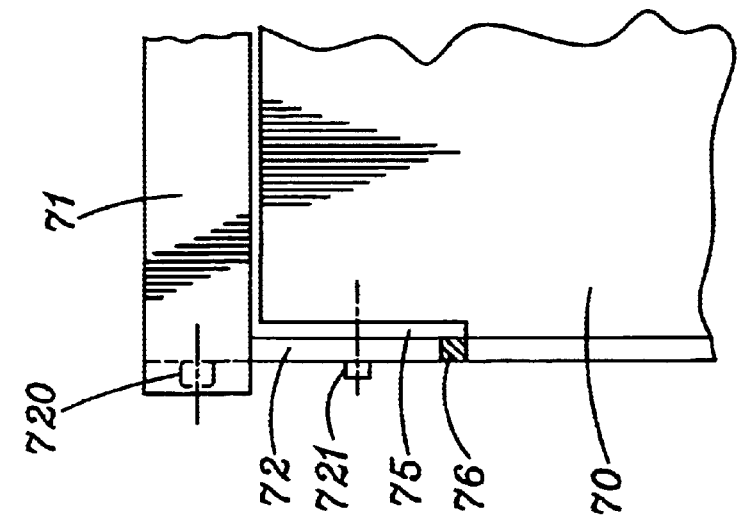
FIG. 11B is a first fragmentary plan view of the box and tray illustrated in FIG. 11.

By pressing laterally on the projection 721, one bends the web 72 inside (FIGS. 11B, 11C, and 11D/arrow P), breaking the area 76. Consequently, only the tab 74 then assumes the rigidity of the insert. Breaking of areas 76 occurs when the insert is placed within the bottom of a standard box, due to the snapping action of the projections 721 before they penetrate in their receiving hole B.

Figure 13:
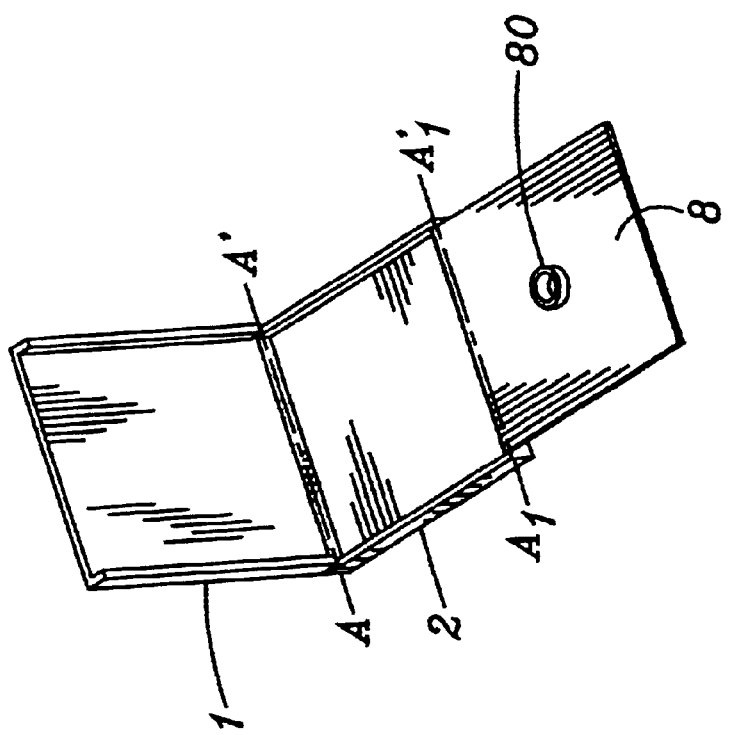

The box shown in FIG. 13 includes a bottom element 2 to which a cover element 1 is hinged by means of a hinge about axis aa'. A tray 8 is provided with two centering and retaining rosettes 80 (only one rosette is illustrated) suitable for receiving a pair of compact discs (not shown), and is itself hinged to the element 2 by means of a hinge of axis a1a1. The axes aa' and $a_1a'_1$ are parallel, with the hinges being located on the two opposite transverse sides of element 2.

Figure 14:
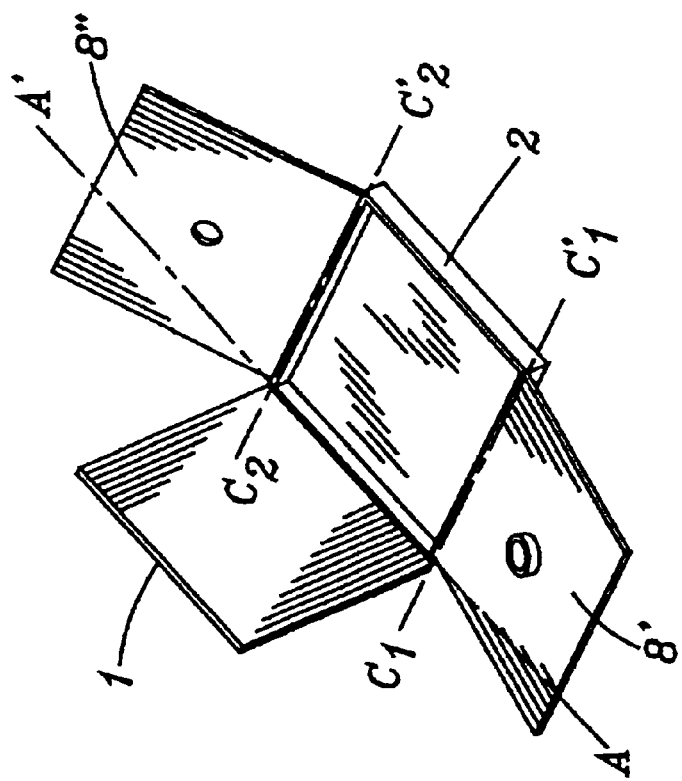
FIGS. 13 and 14 illustrate two other embodiments of boxes for receiving a plurality of compact discs and provided respectively with one and with two pivoting disc-carrying trays.

The box illustrated in FIG. 14 has two disc-carrying trays 8' and 8" each hinged to the bottom element 2 about a respective axis $c_1c'_1$ and $c_2c'_2$, but in this embodiment it is disposed on the two opposite lateral sides of the element 2, perpendicular to the axis aa'. In accordance with the features of the present invention, the hinge axes $a_1a'_1, c_1c'_1, c_2c'_2$ may be implemented by intermediate free zones of flexible sheet adhering by overmolding first to the bottom element 12, and second to the corresponding tray 8, 8' or 8", respectively.

Figure 15:
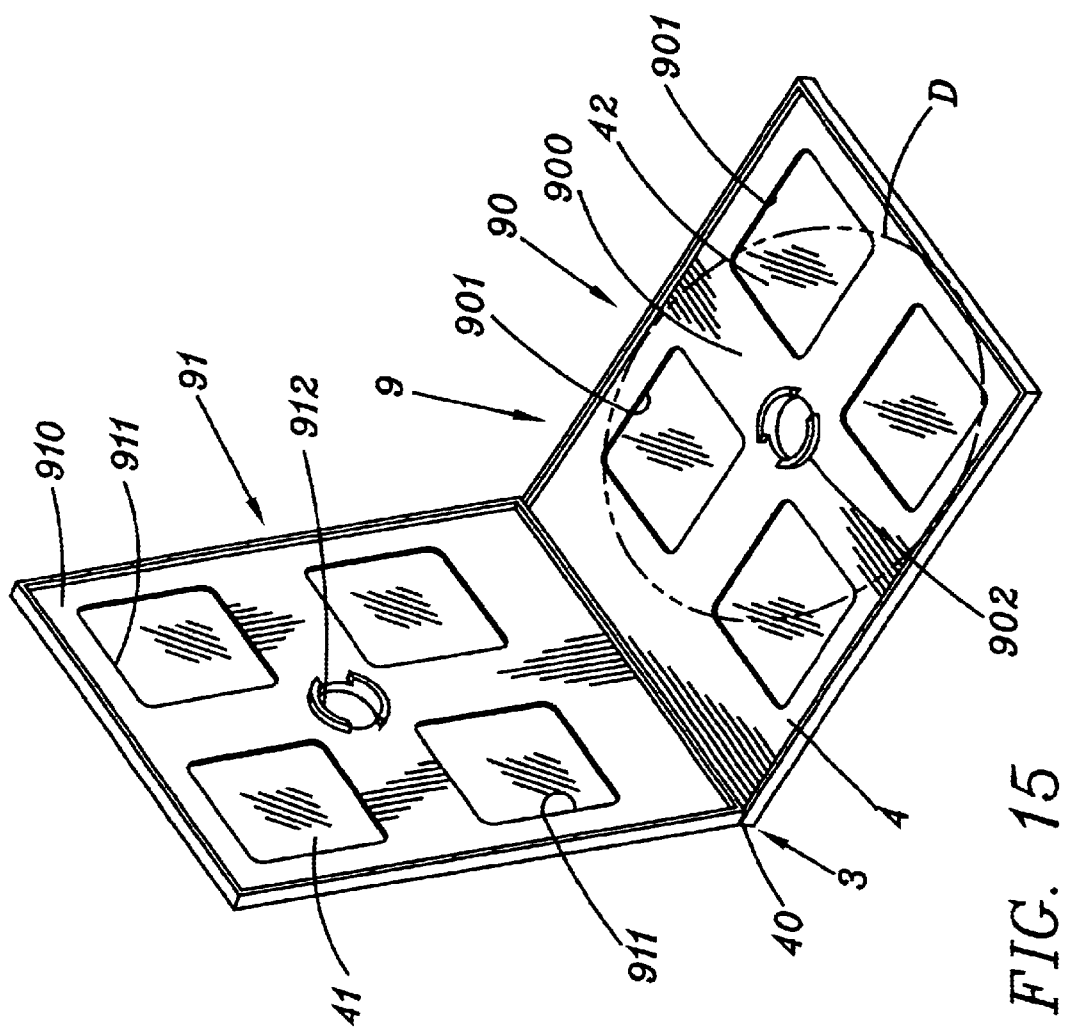
FIG. 15 is a perspective view of a lightweight box whose bottom and cover elements are perforated.

FIG. 15 shows a thin and lightweight box 9 particularly intended for receiving a compact disc D (whose outline is represented by a chain-doted line)which is of the CD-ROM type. It is formed by two similar elements 90 and 91 of rectangular outline that are hinged to each other by hinge 3. Elements 90 and 91 are thin trays with slightly raised rims, between which it is possible to hold captive a compact disc D when the box is closed. Complementary circularly-accurate central ribs 902 and 912 suitable for penetrating into the central opening of the disc serve to hold the disc in the box. Each tray 90, 91 has large perforations which act as weight-reducing openings 901, 911, for example, in the form of squares with rounded corners.

In accordance with the features of the present invention, a flexible label sheet 4 adhering to elements 90 and 91 by overmolding performs the hinge function by means of its intermediate free zone 40. In the specific embodiment shown, portions 41 and 42 of flexible sheet 4 which adhere to the plane portions 900 and 910 (respectively) of elements 90 and 91 (respectively) are situated inside the box. The sheet overlies openings 901 and 911. It has openings shaped to go around projecting portions 902 and 912. Conventional snap-fastening means (not shown) can be provided to hold the two portions 90 and 91 together in a closed position. The material forming elements 90 and 91 is preferably transparent, for example, such as clear polystyrene. Advantageously, the flexible sheet 4 is also transparent, so that the disc and the writing thereon can be seen even when the box is in a closed position. Nevertheless, they may also carry printed markings, either over their entire surface area, or over certain zones only. Although light in weight, primarily because of the openings 901 and 911, elements 90 and 91 act as reinforcements giving the box a certain degree of rigidity. In addition to the hinge function and possibly the label function, flexible sheet 4 also acts to provide protection, with the disc being protected in particular from dust and from finger-contact while it is inside the closed box.

This type of low cost box, that nevertheless provides good protection to the disc can advantageously replace the lightweight card envelopes usually implemented for disseminating CD-ROMs, particularly when they are sold in association with a magazine. A box, or a box element, in accordance with the features of the present invention can receive various articles, i.e.; not only information media, such as compact discs.

Examples of other possible applications, the boxes in accordance with the features of the present invention can be used for receiving foodstuffs or medicines. Thus, for example, in a pharmaceutical application, the box containing medicine has—a bottom and/or a cover of transparent material (e.g.; clear polystyrene) and use may advantageously be made of a hinge sheet that also acts as a label which is printed on both faces. The outside face carries information that is preferably in color relating to the trademark or tradename of the product, and information enabling the medicine to be identified and used. The inside face which can be seen after the box has been opened, carries information for the patient (e.g.; instructions for use, dosages, side effects, composition, etc.). Until now, this kind of information was printed on a folded paper note inserted in the box together with the medicine, but generally is inconvenient to use and runs the risk of being easy to lose.

Figure 16:
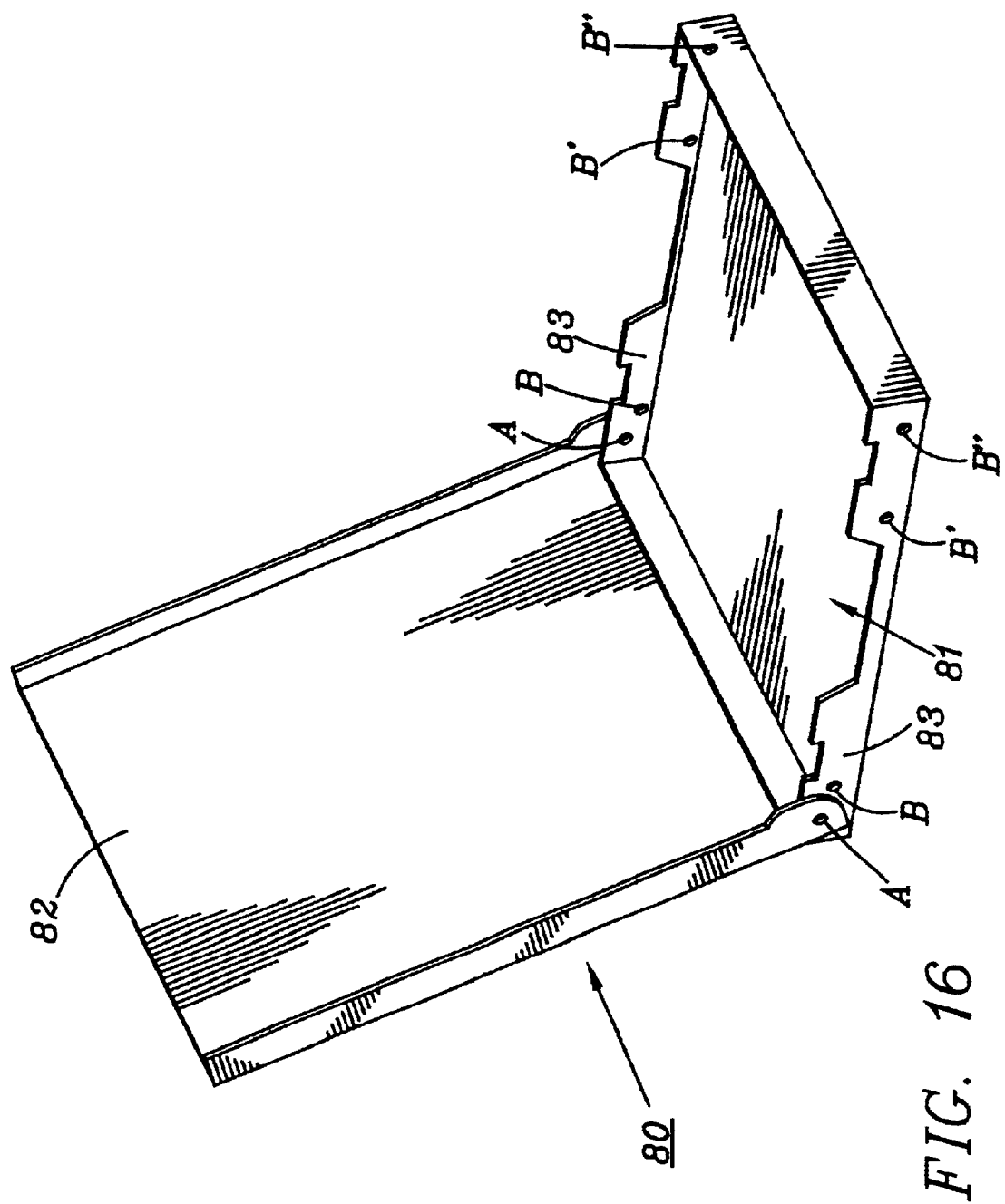
FIG. 16 is a perspective view of another example of a flat compact box for containing a disc, the box being shown in an open position.
Figure 17:
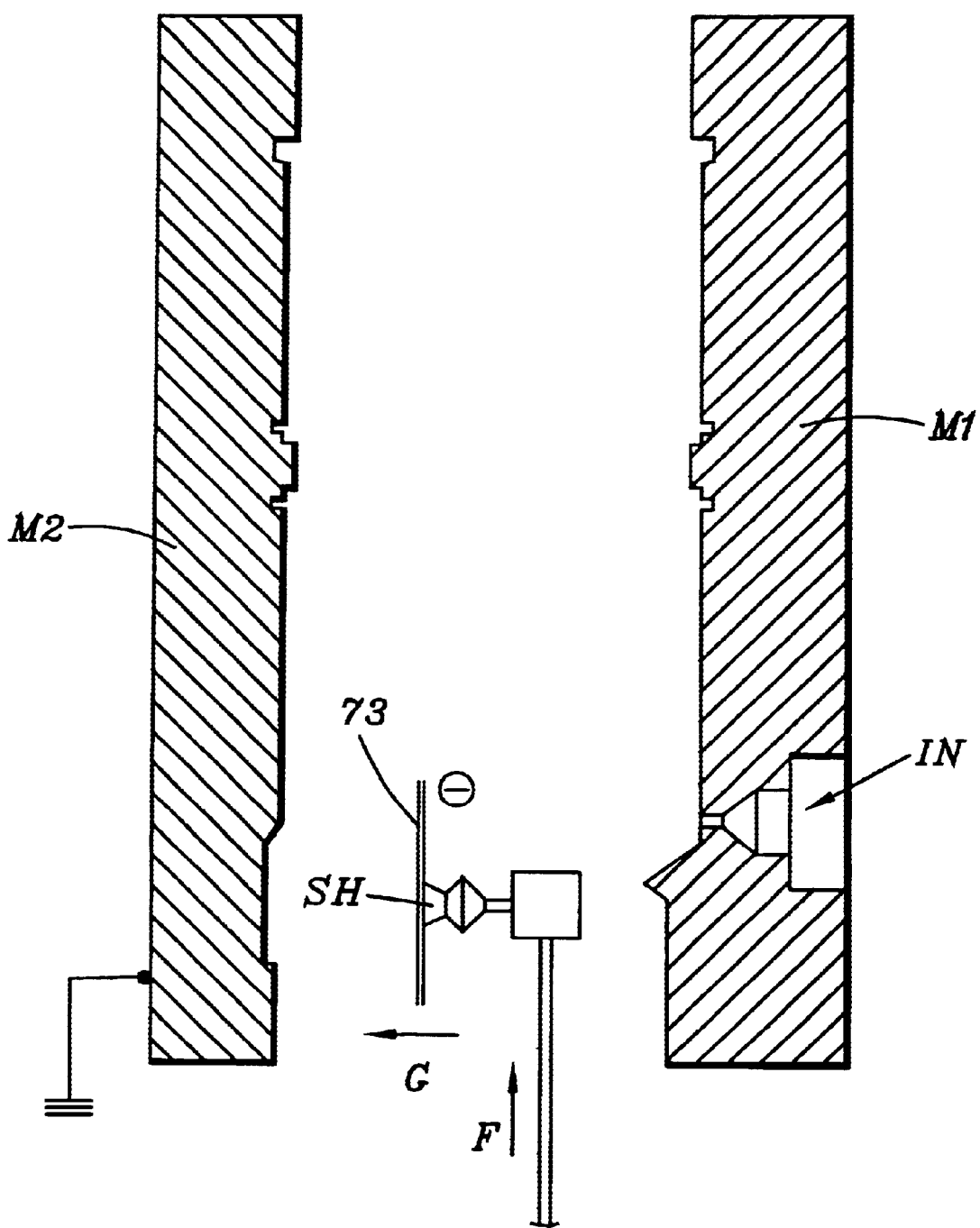
FIGS. 17–24 illustrate partial and complete sectional views of various steps during the method for injection molding of the thermoplastic material for forming a box in accordance with the features of the present invention.
Figure 18:
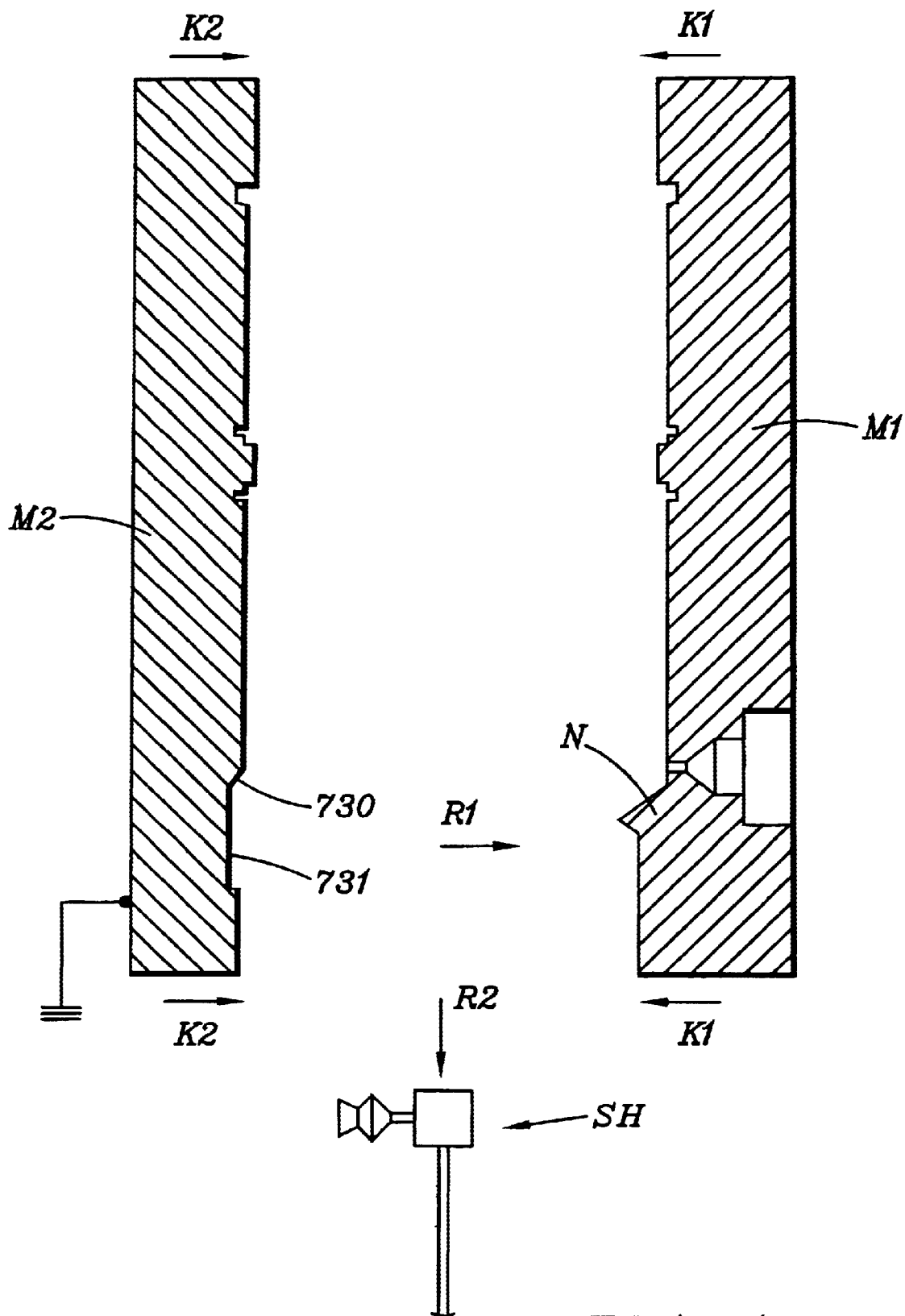
Figure 19:
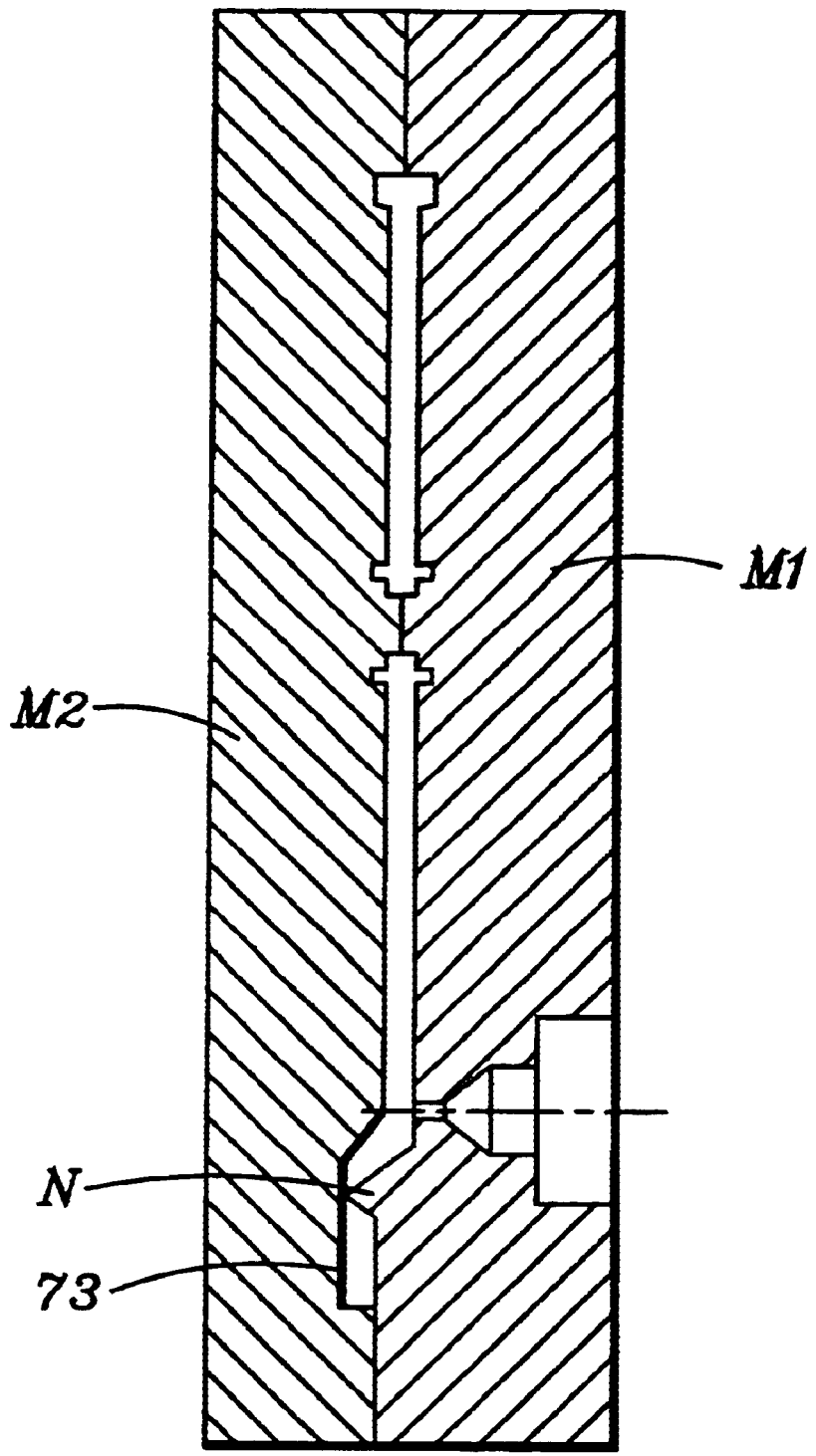

FIG. 16 illustrates another example of a standard box 80 intended to receive a plate (not shown) suitable for supporting a single disc in accordance with the features of the present invention.

The box 80 has a bottom element 81 and a lid element 82 hinged on the bottom by means of a pair of projections penetrating partially, from outside towards the inside, in holes A formed in the lateral walls 83 of the bottom element 81. Additional holes B, B', B", are also provided for receiving projections formed on the sides of the plate to be inserted in the bottom element 81. They snap into these holes from the inside towards the outside. The upper side of the bottom element is provided with a "rosette" (not shown) suitable for receiving and centering a single disc such as a compact disc or a CD-ROM.

The insert, in accordance with the features of the present invention (See FIG. 11) is adapted to hold two discs, one of each side of the tray member 70, this being pivotally connected, via a flexible sheet 73, to the support strip 71, and the support strip 71 member is retained within the bottom by means of two pairs of projections, or studs 720, 721, snapping from inside towards the outside into the holes A and B illustrated in FIG. 16.

The projection forming the pivot axle of the lid on the box bottom element 81 has a length smaller that the thickness of the bottom side walk 83, which corresponds to the length of hole A, so that this hole may simultaneously receive the pivot axle of the lid (penetrating from the outside) and the stud 720 (FIG. 11) (penetrating from the inside).

FIGS. 17–24 illustrate the various steps in the molding method according to the features of the present invention. Injection molding of the thermoplastic material, for example clear polystyrene, occurs between a pair of half complementary molds M1, M2. Reference IN designates the injection nozzle for introducing the hot liquid plastic in the mold. (See FIG. 17). The flexible sheet holder SH is a robot that is provided with a suction head SH retaining the flexible sheet 73. It is operated in such a manner that it enters between two open mold parts M1, M2, in the direction of Arrow F and then deposits the flexible sheet 73 against the mold part M2 in the direction of Arrow G.

Figure 20:
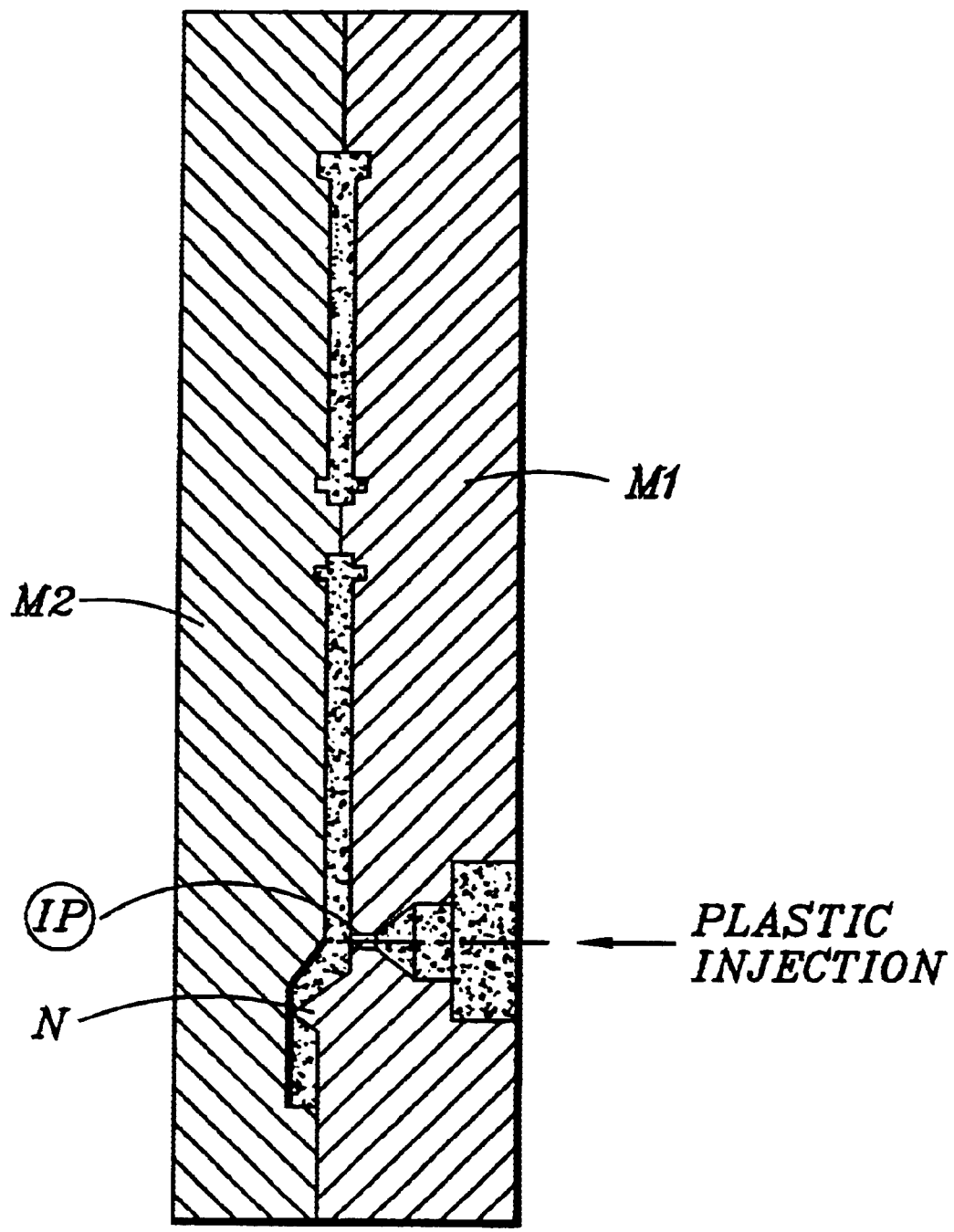

Since the suction head SH is electrically charged with a negative potential and the mold part M2 with a zero (0) potential, the flexible sheet 73 will be retained by an electrostatic charge against mold part M2. The flexible sheet 73 assumes the shape of the mold cavity, forming an angle corresponding to portions 730, 731 (See FIG. 11) Thereafter the robot head is retracted (Arrows R1, R2) and the mold parts M1, M2 are brought together (Arrows K1 and K2 in FIG. 18) When the mold is closed (FIG. 19), the plastic is injected through the injection nozzle (FIG. 20).

Figure 22:
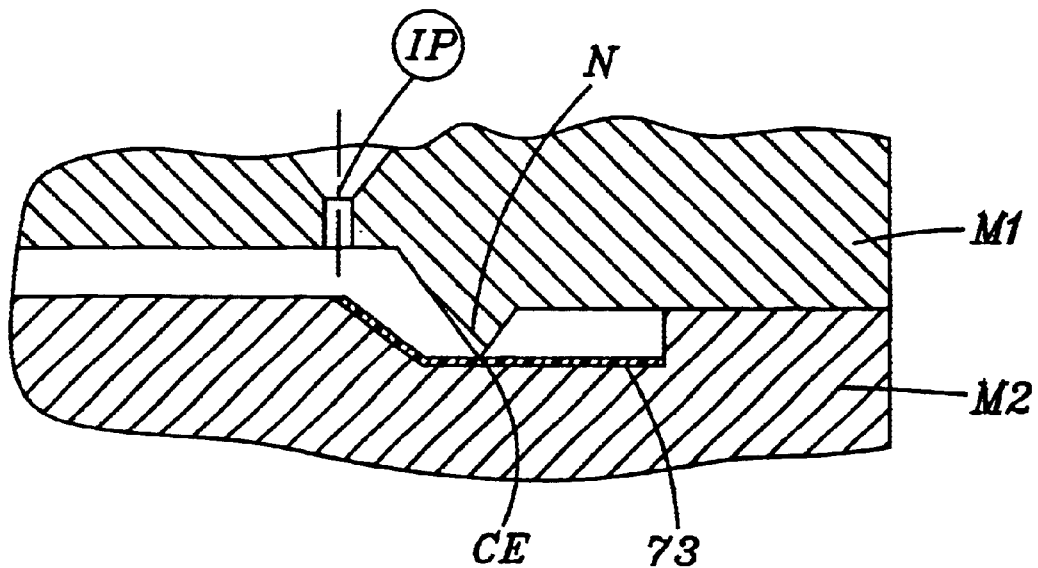
Figure 23:
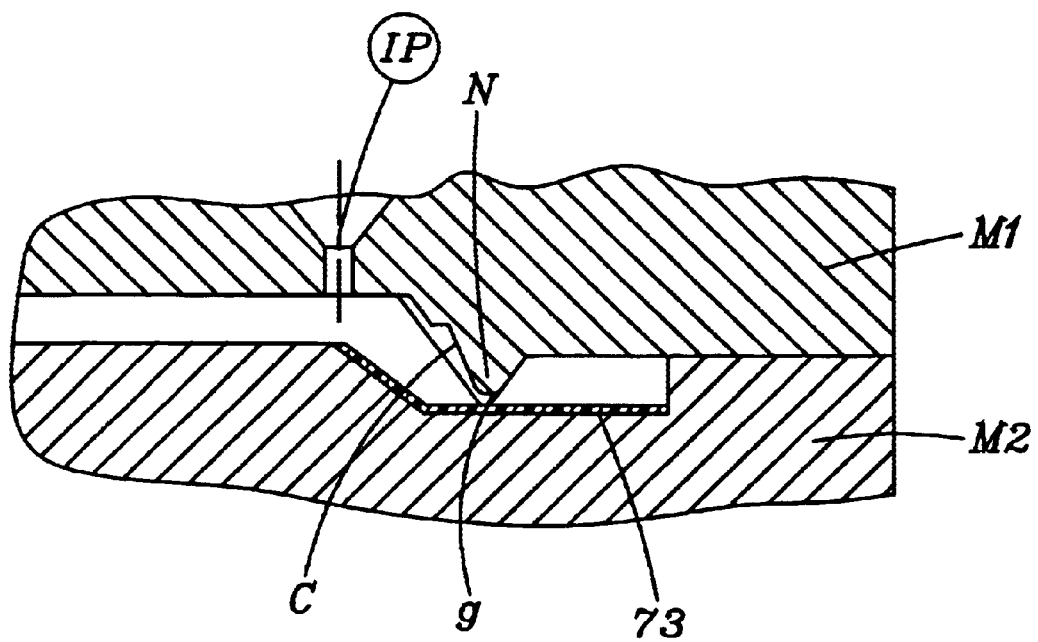
Figure 24:
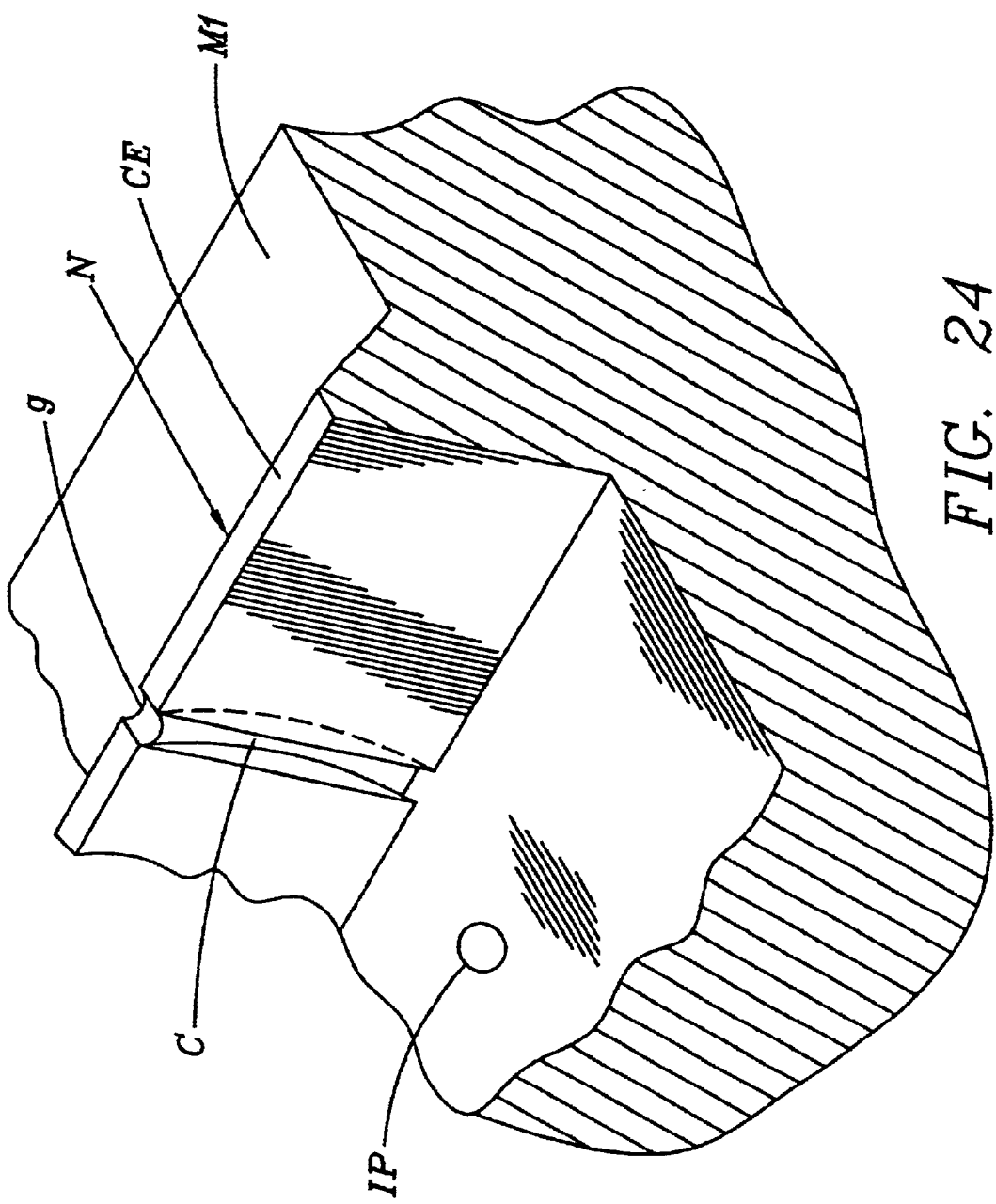
Figure 25:
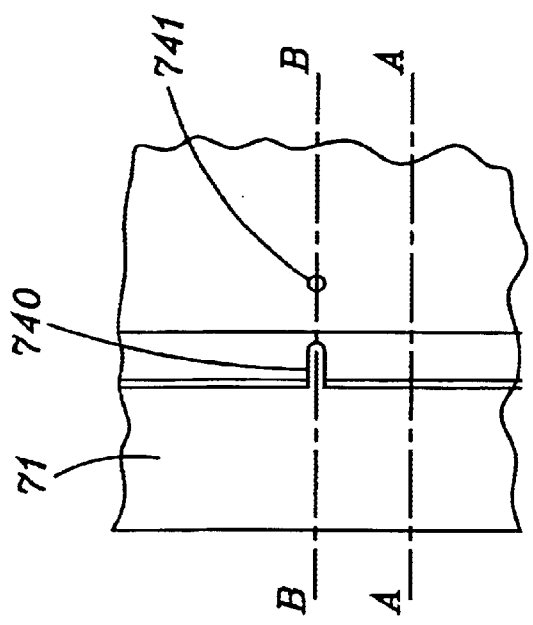
FIGS. 25–29 are various fragmentary views of the box element of FIG. 11.

As shown in FIGS. 22, 23 and 24, the mold's part M1 has an inner protuberance, or "nose" N, having the shape of a dihedron (V section) with a flat chamfered edge CE. The latter edge presses against the sheet 73 when the mold is closed, so that the molten plastic cannot cover this protected area of the sheet. The protected area will correspond to the hinge.

According to two critical features of the invention pertaining to the molding process:

(i) The injection point IP is situated on the longitudinal symmetry plane (X—X, FIG. 11A) of the element, in the vicinity of the nose N, very close to sheet 73.

(ii) On the longitudinal symmetry plane, the nose edge CE is provided with a small gap g. The flange of the nose situated on the same side as the injection point is provided with a channel c which opens on the gap Thus, the molten fluid plastic coming out from the injection nozzle can pass through channel c and gap g in order to from the strip member 71. It can also flow in the main part of the mold, forming the tray element 70.

Figure 21:
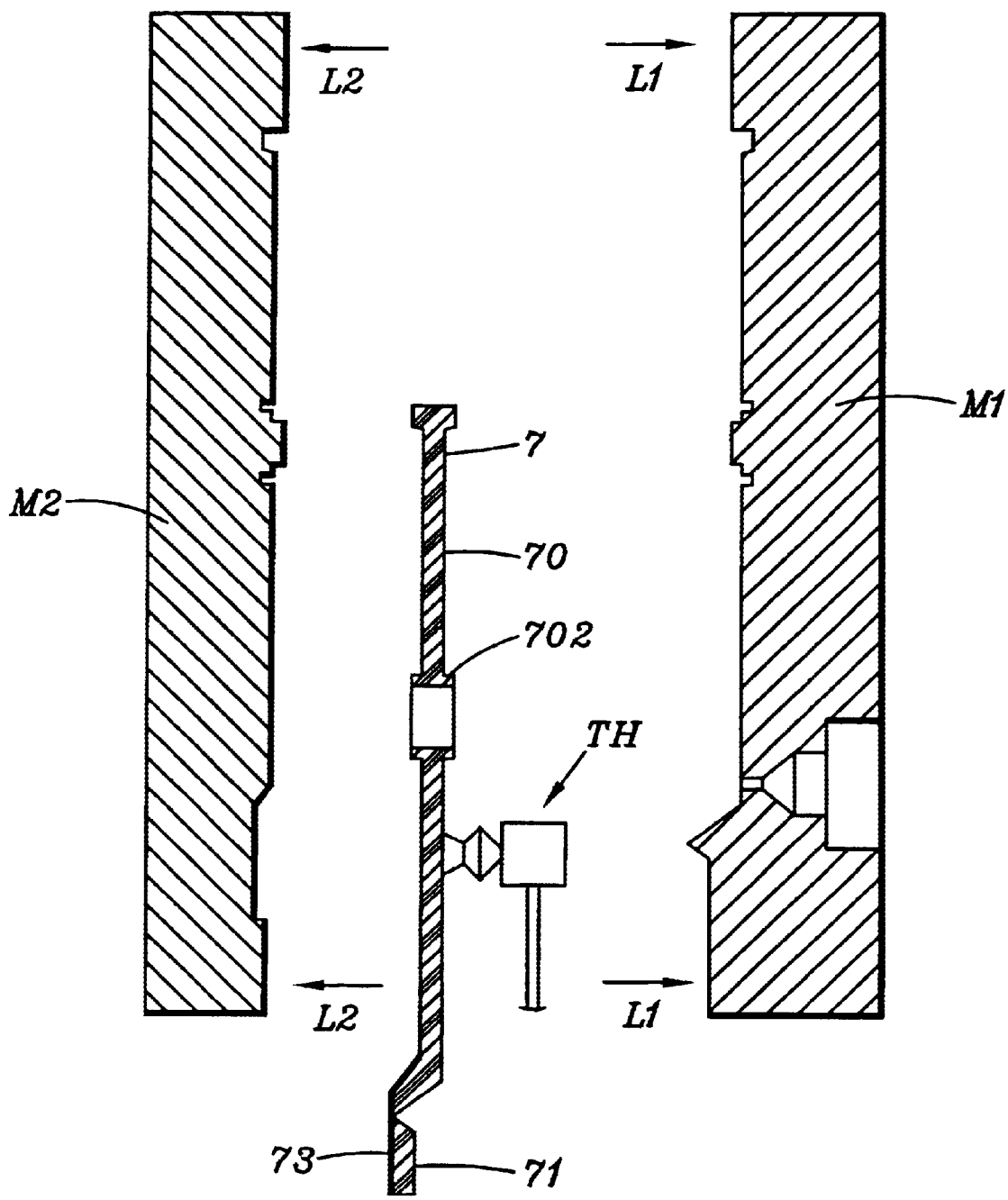

The arrows in FIG. 11A illustrate basically how the molten plastic flows from injection point IP for filling the mold, forming simultaneously the two parts 70 and 71. After cooling, one opens the mold (FIG. 21, arrows L1, L2). A robot with a suction head TH carries away the finished element.

Figure 27:
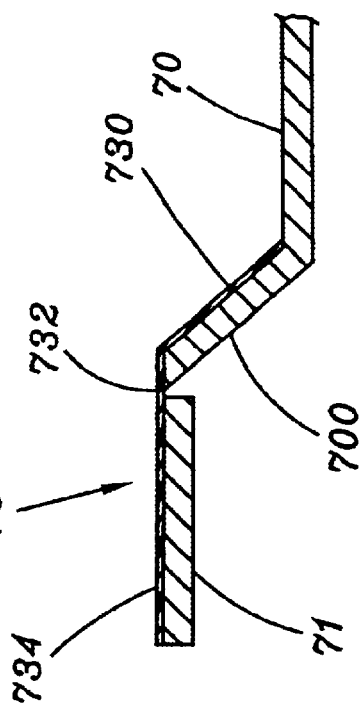
Figure 26:
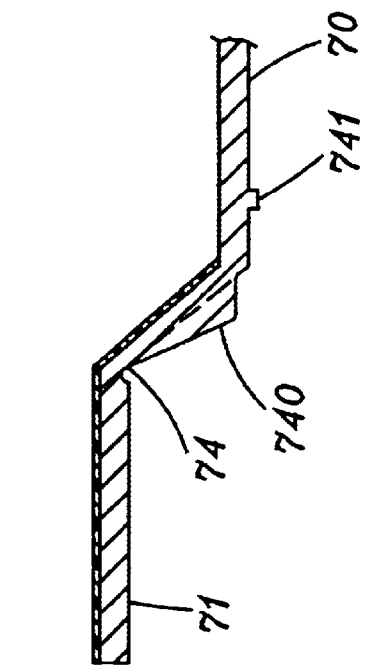
Figure 28:
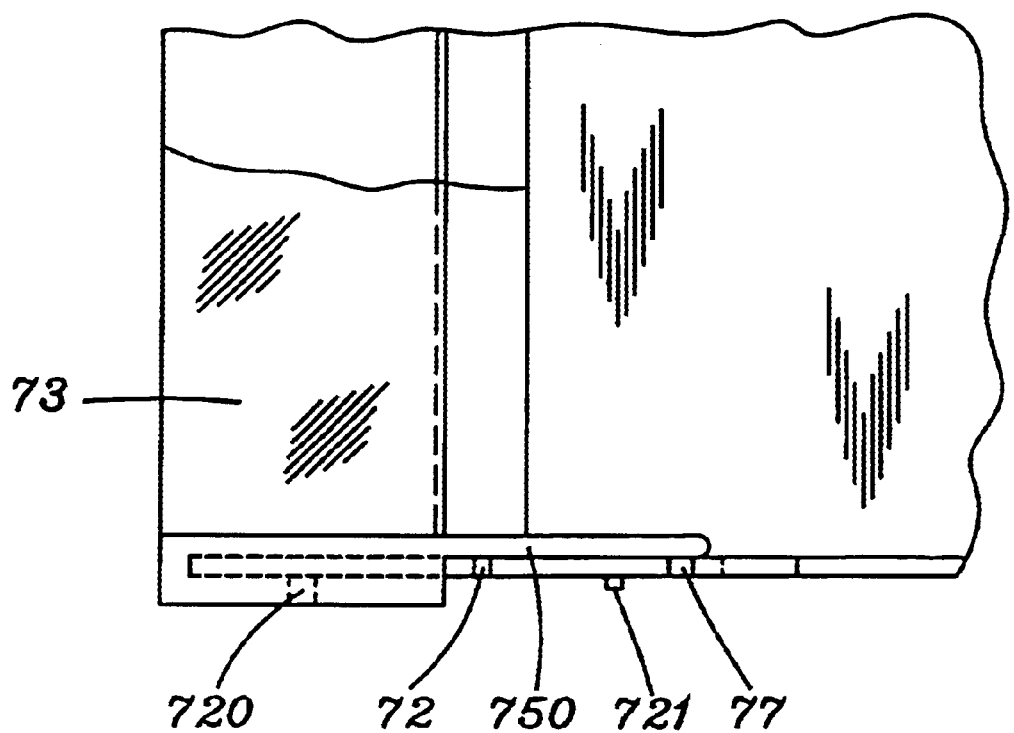
Figure 29:
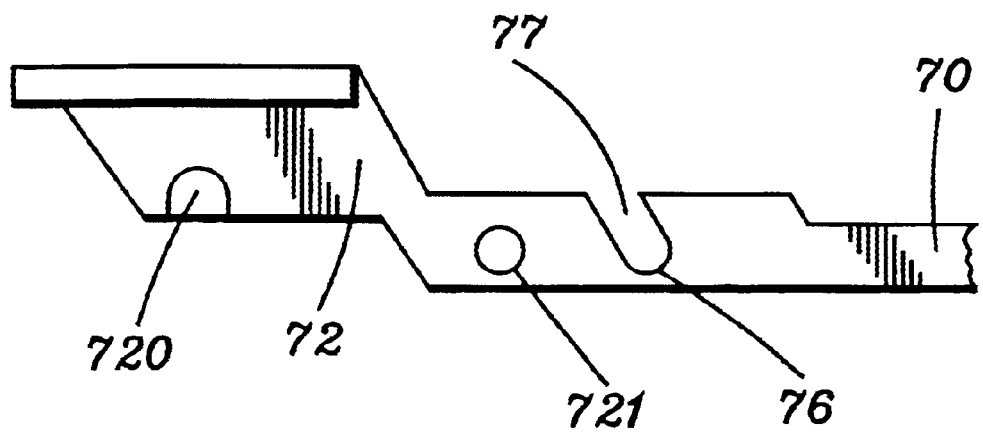

As can be seen, particularly in FIGS. 25–29, parts 70 and 71 are connected on the central area of the element by the bridge 740 (corresponding to channel c) and the frangible tab 74 (corresponding to gap g). On both sides of the tab 74, there is a free zone 732, where the sheet 73 totally exposed (FIG. 27).

Figure 30:
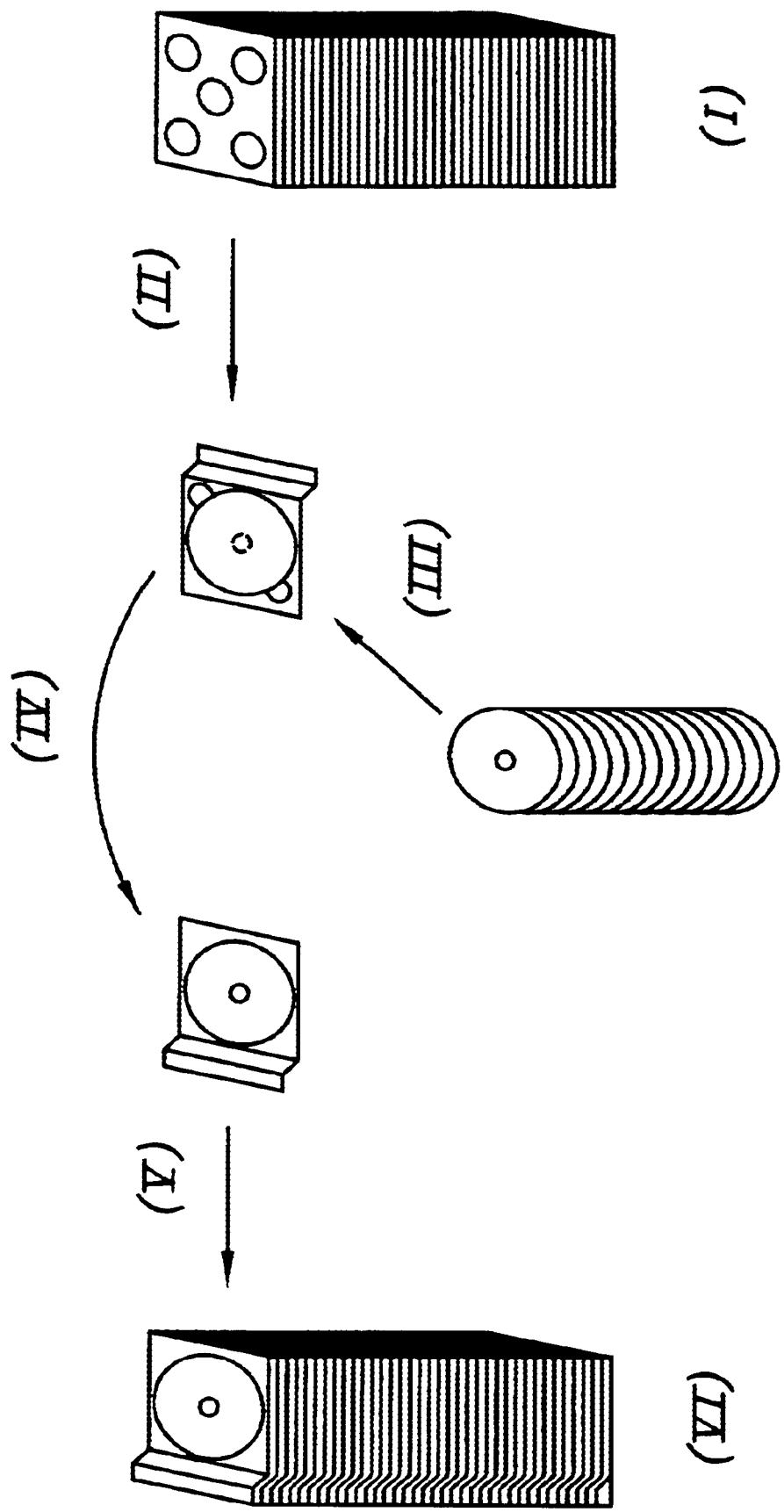
FIGS. 30 and 31 illustrate a schematic representation of the process for depositing a pair of discs on a tray member of a box insert and then inserting the box insert within a box in accordance with the features of the present invention.
Figure 31:
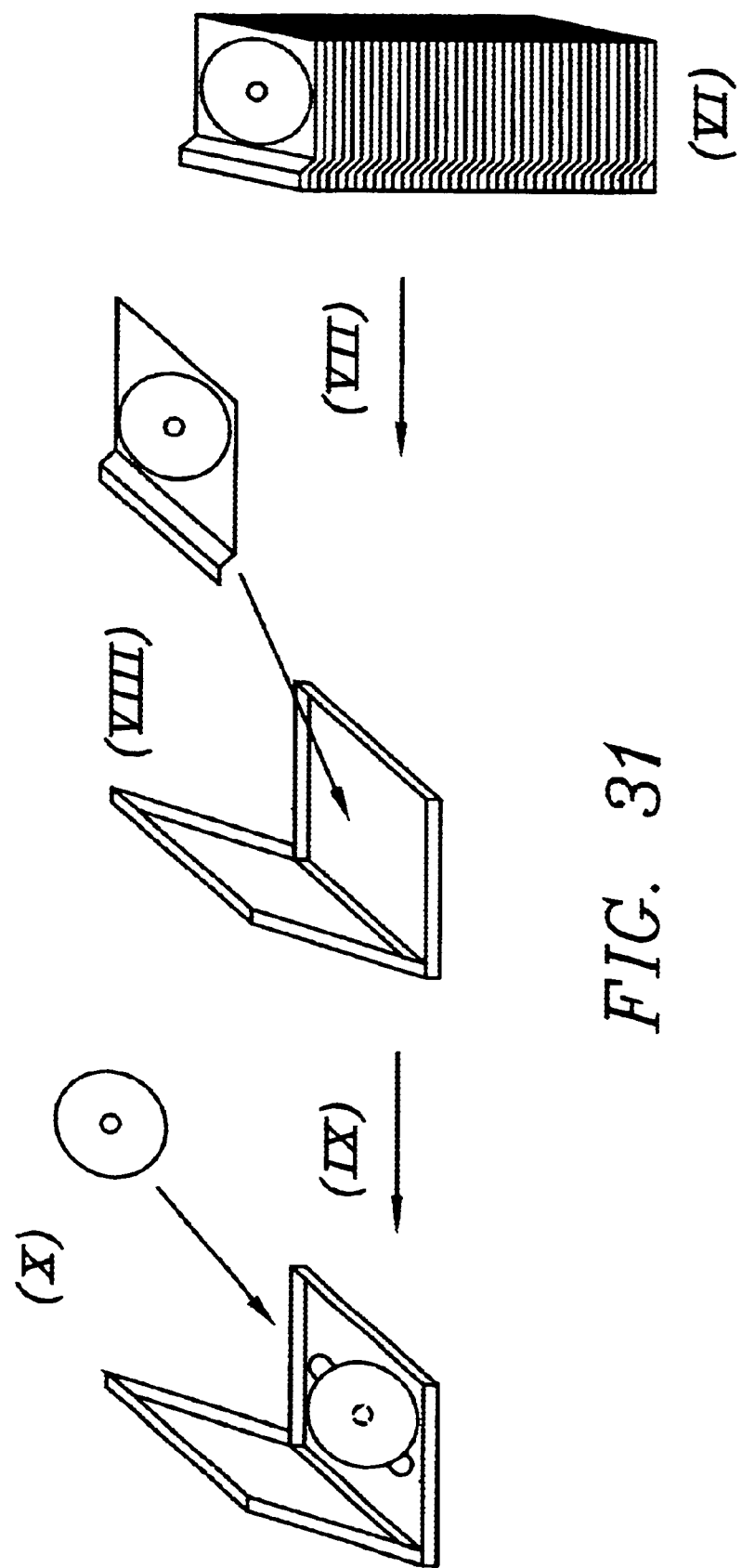

FIGS. 30 and 31 illustrate a manufacturing procedure for placing two discs on an insert, and placing the insert subsequently into a standard box.

FIG. 30(I) illustrates a stack of inserts which have been molded according to the method described above. The inserts are rigid. The web and the tray are connected by three points: central tab 74 and two lateral areas 76 (See FIG. 11). The stack of inserts has basically been transported from the manufacturer of the inserts to the disc manufacturer who then places a pair of discs on each tray member of, each insert, and then introduce the trays into a standard box.

It is important that this procedure be conducted on rigid inserts, since it is possible to operate with a high speed, by means of automated handling devices such as robotic devices. FIG. 30(II) and FIG. 30(III) illustrate the steps of destacking inserts, and placing a disc on one side thereof (on its upper side, on its central "rosette"). FIG. 30(IV) and FIG. 30(V) illustrate the steps of returning the insert, its upper side holding the disc becoming the under side, and stacking it again for forming a new pile FIG. 30(VI) of inserts having one disc beneath. All these operations are easily automatizable since the inserts are rigid. If the strip member and the tray member were hinged on each other, they could become entangled.

FIG. 31(VII) illustrates the step of destacking an insert from pile FIG. 30(VI); FIG. 31(VIII) shows the step of placing the insert inside a standard box. During this operation, the lateral frangible areas 76 are broken, as explained above with regard to FIGS. 11B, 11C and 11D. The disc is situated under the tray, against the inside upper face of the bottom element of the box. Thereafter, the box and the tray are transferred FIG. 31(IX) to another station FIG. 31(X) where the second disc is placed on the upper face of the tray, (which has already been inserted inside the box). The box is then close, and may be wrapped in a protective film and transported to a retail store, in order to be sold. The tray is still rigid, due to remaining non-broken central tab 74 (FIG. 11). This is a guarantee for the consumer that the product has not be used yet. The consumer will break tab 74 when the consumer will pivot the tray for the first time, in order to access the disc situated below.

While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method for manufacturing an insert, the insert being adapted to retain a pair of compact discs therein, the insert being dimensioned and shaped so that it is capable to be inserted within a standard box initially intended for storing s single disc, the insert is composed of two thermoplastic elements including a first element comprising a strip member adapted to be secured to the box, and a second element comprising a tray member adapted to support a pair of compact discs, one against each of its two faces, the elements being formed of rigid and brittle plastic material and being hinged to each other by a single hinge, the hinge including a flexible thin sheet having mechanical strength and being compatible on molding with the material forming said elements, the flexible thin sheet being fixed to each of the elements by overmolding during injection molding, the hinge being formed by an area of the flexible material which is free of the rigid plastic material, wherein one uses an injection mold comprising two complementary half mold parts comprising a first part and a second part, which may either be brought together in order to close the mold or separated from each other in order to open the mold, the mold defining in its closed state two adjacent cavities, the first cavity corresponding to the shape of the tray member and the second cavity to the shape of said strip member, the first half mold part being provided with an injection nozzle having a point, the nozzle suitable for introducing hot molten thermoplastic material into the first cavity when the mold is closed, the cavities being separated from each other, when the mold is closed, by a protuberance formed in one of the half mold parts and having substantially a shape with a chamfered linear nose edge which comes very close to a flat area of the other half mold part when the mold is closed, the nose edge being cut by at least a transverse gap situated in the vicinity of the injection nozzle when the mold is closed, the method comprising the following steps:

(a) introducing the flexible sheet between the mold parts and positioning the sheet against flat area, in front of said nose;

(b) holding said flexible sheet against the flat area;

(c) closing the mold, so that said chamfered linear edge of the nose firmly presses the flexible sheet toward the flat area;

(d) injecting molten thermoplastic material into the mold through the injection nozzle so that it simultaneously fills directly the first cavity and via the gap, the second cavity, covering a side of the flexible sheet without coating the part that is gripped between the chamfered linear edge and the flat area;

(e) allowing the injected material to cool and to become stiff; and (f) ejecting the molded insert, the strip member and the tray member while each remain rigidly connected to each other by at least a frangible tab constituted by the material contained in the gap at the end of the molding process, in such manner that the hinging can only occur later, after breaking of the tab when the user pivots the tray member for the first time, wherein the said injection point and said gap are situated centrally, on a longitudinal symmetry plane X—X of said insert.

2. A method for manufacturing an insert in accordance with claim 1 wherein prior to step (a) the mold is opened to separate the two half mold parts from each other.

3. A method for manufacturing an insert in accordance with claim 1 wherein prior to step (f) the mold is opened.

4. A method for manufacturing an insert in accordance with claim 1 the said sheet is retained by electrostatic charge against said mold part.

5. A method for manufacturing an insert in accordance with claim 1 wherein the said flange of said nose is situated on the same side as said injection point is provided with a channel which opens on said gap.

6. A method for manufacturing an insert in accordance with claim 1 wherein there are two additional frangible areas situated on the lateral sides of said insert.

7. A method for manufacturing an inset in accordance with claim 1 wherein the said standard box has a bottom and a lid hinged on the bottom by means of a pair of projections penetrating partially, from outside towards the inside, in holes formed in the lateral walls of said bottom and other holes are also provided for normally receiving projections formed on the sides of the plate to be inserted in the bottom, said support strip being retained within the bottom by means of two pairs of projections, snapping from inside towards the outside into the holes.

8. A method for manufacturing an insert in accordance with claim 1 wherein the said lateral transverse webs which form integral parts of said support strip member are also connected to the lateral sides of said tray member by thin breakable areas constituted by the material remaining at the basis of a notch.

9. A method for manufacturing an insert in accordance with claim 1 wherein breaking of areas occurs when the insert is placed within the bottom of a standard box, due to the snapping action of said projections before they penetrate in their receiving hole.

* * * * *